(12) United States Patent
Kim et al.

(10) Patent No.: US 12,022,381 B2
(45) Date of Patent: Jun. 25, 2024

(54) METHOD AND DEVICE FOR MANAGING IDENTIFIER OF UE IN EDGE COMPUTING SERVICE

(71) Applicant: Samsung Electronics Co., Ltd., Suwon-si (KR)

(72) Inventors: Sunghoon Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/595,077

(22) PCT Filed: May 11, 2020

(86) PCT No.: PCT/KR2020/006147
§ 371 (c)(1),
(2) Date: Nov. 8, 2021

(87) PCT Pub. No.: WO2020/231120
PCT Pub. Date: Nov. 19, 2020

(65) Prior Publication Data
US 2022/0191776 A1  Jun. 16, 2022

(30) Foreign Application Priority Data

May 10, 2019  (KR) .................. 10-2019-0055272
Jun. 28, 2019  (KR) .................. 10-2019-0078131

(51) Int. Cl.
*G06F 15/173* (2006.01)
*H04L 67/306* (2022.01)
(Continued)

(52) U.S. Cl.
CPC .......... *H04W 48/16* (2013.01); *H04L 67/306* (2013.01); *H04L 67/51* (2022.05); *H04W 8/20* (2013.01); *H04W 12/06* (2013.01)

(58) Field of Classification Search
CPC ....... H04W 48/16; H04W 8/20; H04W 12/06; H04L 67/51; H04L 67/306
(Continued)

(56) References Cited

U.S. PATENT DOCUMENTS

2012/0099578 A1  4/2012  Aramoto et al.
2018/0262924 A1  9/2018  Dao et al.
(Continued)

FOREIGN PATENT DOCUMENTS

CN           102461234 A     5/2012
KR        20200115155 A    10/2020
(Continued)

OTHER PUBLICATIONS

"Mobile Edge Computing (MEC); End to End Mobility Aspects", Draft ETSI GR MEC 018 v1.0.1 (Sep. 2017), 53 pages.
(Continued)

*Primary Examiner* — Alan S Chou

(57) ABSTRACT

The present disclosure relates to a method and device for providing an edge computing service to a user equipment (UE) in a communication system, and more particularly, to a method and device for managing an identifier of a wireless communication UE so as to provide an edge computing service to the UE. A method according to an embodiment of the present disclosure is a method for managing an identifier of a UE in an edge enabler server of an edge computing system, and the method may comprise the operations of: receiving a first message via a mobile communication network from a UE of a mobile communication system, wherein the first message includes a generic public subscription identifier (GPSI) of the UE, and the received identifier of the UE identifies validity on the basis of a previously received profile of the UE; if the identifier of the UE is valid, binding and storing the identifier of the UE and a UE IP
(Continued)

address based on the received first message; and if the identifier of the UE is valid, transmitting a first response message to the UE.

18 Claims, 17 Drawing Sheets

(51) Int. Cl.
*H04L 67/51* (2022.01)
*H04W 8/20* (2009.01)
*H04W 12/06* (2021.01)
*H04W 48/16* (2009.01)

(58) Field of Classification Search
USPC .......................................................... 709/224
See application file for complete search history.

(56) References Cited

U.S. PATENT DOCUMENTS

| | | |
|---|---|---|
| 2019/0053010 A1 | 2/2019 | Edge et al. |
| 2019/0174449 A1* | 6/2019 | Shan ..................... H04W 60/00 |
| 2019/0380028 A1* | 12/2019 | Rasanen ............... H04W 12/02 |
| 2020/0045753 A1* | 2/2020 | Dao ........................ H04W 4/08 |
| 2021/0184875 A1* | 6/2021 | Qiao ..................... H04W 76/11 |
| 2022/0022029 A1* | 1/2022 | Di Girolamo .......... H04W 4/50 |
| 2022/0086632 A1* | 3/2022 | Wang .................. H04W 12/069 |

FOREIGN PATENT DOCUMENTS

| | | |
|---|---|---|
| KR | 20200115333 A | 10/2020 |
| WO | 2017100640 A1 | 6/2017 |
| WO | 2018/095510 A1 | 5/2018 |

OTHER PUBLICATIONS

Supplementary European Search Report dated Apr. 29, 2022 in connection with European Patent Application No. 20 80 6345, 12 pages.
International Search Report and Written Opinion of the International Searching Authority in connection with International Application No. PCT/KR2020/006147 dated Aug. 20, 2020, 9 pages.
3GPP TR 28.803 V0.5.0 (Apr. 2019), 3rd Generation Partnership Project; Technical Specification Group Services and System Aspects; Telecommunication management; Study on management aspects of edge computing (Release 16) Apr. 2019, 18 pages.
Huawei et al., "AF influence for traffic forwarding in 5GLAN", S2-1905750, 3GPP TSG-SA WG2 Meeting #133, Reno, NV, USA, May 13-17, 2019, 8 pages.
3GPP TS 23.501 V16.0.2 (Apr. 2019), 3rd Generation Partnership Project; Technical Specification Group Services and System Aspects; System Architecture for the 5G System; Stage 2 (Release 16) Apr. 2019, 317 pages.
3GPP TR 23.758 V0.1.0 (Apr. 2019), 3rd Generation Partnership Project; Technical Specification Group Services and System Aspects; Study on application architecture for enabling Edge Applications; (Release 17), Apr. 2019, 11 pages.
Office Action dated Oct. 30, 2023, in connection with Korean Patent Application No. 10-2019-0078131, 8 pages.
Office Action issued Mar. 29, 2024, in connection with Chinese Patent Application No. 202080035023.X, 17 pages.

* cited by examiner

METHOD AND DEVICE FOR MANAGING IDENTIFIER OF UE IN EDGE COMPUTING SERVICE

CROSS-REFERENCE TO RELATED APPLICATIONS

This application is a 371 of International Application No. PCT/KR2020/006147, filed May 11, 2020, which claims priority to Korean Patent Application No. 10-2019-0055272, filed May 10, 2019, and Korean Patent Application No. 10-2019-0078131, filed Jun. 28, 2019, the disclosures of which are herein incorporated by reference in their entirety.

BACKGROUND

1. Field

The disclosure relates to a method and an apparatus for providing an edge computing service to a UE in a communication system and, more particularly, to a method and an apparatus for managing an identifier of a UE to provide an edge computing service to a wireless communication UE.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

An edger computing technology for transmitting data through an edge server is recently discussed. The edge computing technology may include, for example, Multi-access Edge Computing (MEC) or fog computing. The edge computing technology may be a technology for providing data to an electronic device through a separate server (hereinafter, referred to as an edge server or an MEC server) installed geographically close to the electronic device, for example, within a base station or near the base station. For example, an application requiring low latency among at least one application installed in the electronic device may transmit and receive data through an edge server installed at a geographically close location without passing through a server located in an external Data Network (DN) (for example, Internet).

SUMMARY

However, discussion to apply the edge computing technology to the User Equipment (UE) in the mobile communication system is in progress. Accordingly, when the edge computing service is provided to the UE in the mobile communication system, a method and an apparatus for managing an identifier of the UE and a signaling method thereof are needed.

The disclosure provides a method and an apparatus for managing an identifier of the UE in the mobile communication system and a signaling method thereof in the edge computing system.

A method according to an embodiment of the disclosure is a method of managing an identifier of a UE by an edge enabler server in an edge computing system, and the method includes: receiving a first message from the UE of a mobile communication system through a mobile communication network, the first message including a Generic Public Subscription Identifier (GPSI) of the UE; identifying validity of the received identifier of the UE, based on a pre-received profile of the UE; binding and storing an IP address of the UE based on the received first message and the identifier of the UE when the identifier of the UE is valid; and transmitting a first response message to the UE when the identifier of the UE is valid.

An apparatus according to an embodiment of the disclosure is an apparatus of an edge enabler server in an edge computing system, and the apparatus includes: an interface configured to communicate with a mobile communication network; a memory configured to store an identifier of a UE in the mobile communication network; and at least one processor, and the at least one processor
performs control to receive a first message from the UE in the mobile communication system through the interface, the first message including a Generic Public Subscription Identifier (GPSI) of the UE, identify validity of the received identifier of the UE, based on a pre-received profile of the UE, bind an IP address of the UE based on the received first message and the identifier of the UE when the identifier of the UE is valid and store the bound information in the memory, and transmit a first response message to the UE when the identifier of the UE is valid.

According to the disclosure, a method and an apparatus for managing an identifier of a UE in a mobile communication system and a signaling method thereof may be provided in an edge computing system. Accordingly, an edge computing service may be provided to the UE in the mobile communication system.

According to an embodiment of the disclosure, an edge computing platform may provide a capability exposure Application Program Interface (API) for an edge computing service to a 3rd application server operating in infrastructure of an edge data network to which the edge computing platform belongs.

According to the disclosure, the edge computing platform may manage an ID of the UE through the method proposed in the embodiment of the disclosure, and provide required information by using a network capability exposure API of the mobile communication system, for example, the 3GPP system, for the capability exposure API requested by a 3rd application server on the basis of the ID.

Further, the capability exposure API which the edge computing platform provides to the 3rd application server has the following effects. First, the 3rd application server may use a useful capability exposure function in the corresponding edge data network. For example, an API for identifying the location of the UE, an API for identifying a connection state of the UE, and the like may be used. They may be used to provide a better service by the 3rd application server. Second, the 3rd application server may use the capability exposure function only through a contract with an edge computing platform provider without any service level agreement for performing the network capability exposure by direct negotiation with the mobile communication system, for example, the 3GPP system. Accordingly, the edge computing platform provider may provide the capability exposure function without any additional effort of the 3rd application server, and thus have business earnings due thereto.

According to an embodiment of the disclosure, an edge computing platform may directly allocate an identifier of the UE used when providing a capability exposure Application Program Interface (API) for an edge computing service to a 3rd application server operating in infrastructure of an edge data network to which the edge computing platform belongs. The edge computing platform may be a platform function of a system to which edge servers included in the edge network are connected. Accordingly, the edge computing platform may be an edge enabler server connected to the edge server or a server for implementing a platform in which edge servers operate.

At this time, when allocating UE identifiers, the edge computing platform may allocate different UE identifiers to respective 3rd applications, and accordingly the UE identifiers are not shared between 3rd applications. Therefore, when the 'capability exposure Application Program Interface (API)' for acquiring information on the UE is provided to a 3rd application, privacy of the UE identifier may be secured and thus the corresponding information may be prevented from being misused or tracked by a 3rd application.

DETAILED DESCRIPTION

Figure 1A:
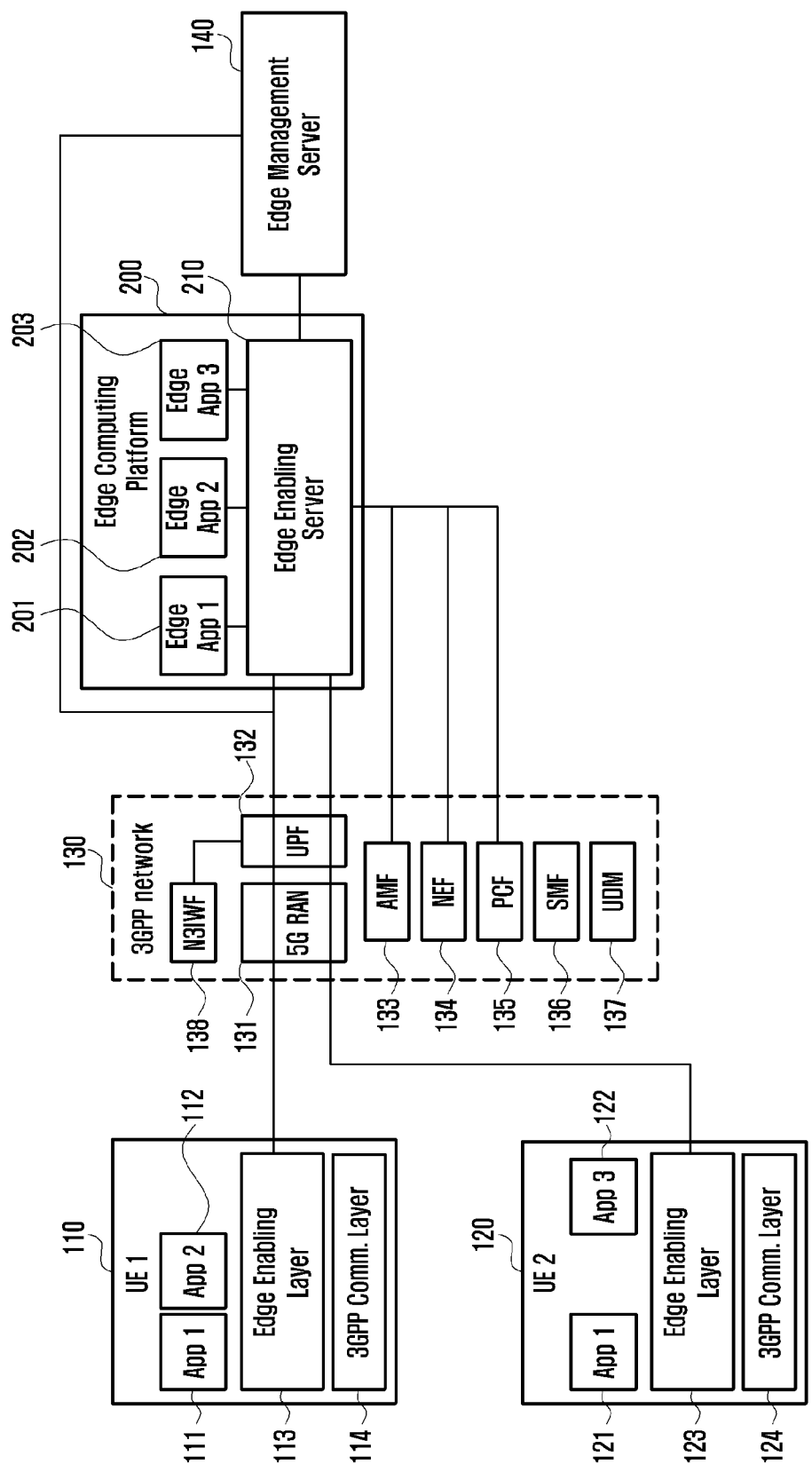
FIG. 1A illustrates a structure of an MEC platform which can interwork with a 3GPP mobile communication system and a connection between electronic devices according to an embodiment of the disclosure.

Hereinafter, exemplary embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

The disclosure discloses the content in which a UE establishes a data connection to an edge data network located close to the UE in order to use a low-latency or broadband service in a communication system. Further, the disclosure discloses a technology of accessing a 3rd application server operating on an edge computing platform managed in the corresponding edge data network to use a data service. The disclosure discloses the content for mobile edge computing.

The disclosure discloses a method of managing an identifier of the UE to support an edge computing service and a method of providing the method to a 3rd application server operating on an edge computing platform.

The UE accesses a 3rd application server (hereinafter, referred to as an edge application server) operating on an edge computing platform to use an edge computing service. According to an embodiment, the edge application server may acquire required information for the UE through a capability exposure application program interface (hereinafter, referred to a "capability exposure API") provided by the edge computing platform. According to another embodiment, the edge application server may transmit a request for the UE to the edge computing platform by using the capability exposure API provided by the edge computing platform.

According to an embodiment, in order to provide the capability exposure API, the edge computing platform may be connected to a 3GPP system and use an external network capability exposure API provided by the 3GPP system. In addition, the edge computing platform should use the external network capability exposure API of the 3GPP system corresponding to the capability exposure API requested by the edge application server. However, since the edge application server cannot know an identifier (ID) used by the UE in the 3GPP system, the edge application server cannot make a request for the capability exposure API to the edge computing platform on the basis of an ID of the UE which the 3GPP system can recognize. Therefore, the edge computing platform cannot determine which UE ID has to be used for the external network capability exposure API provided by the 3GPP system. As a result, a capability exposure function cannot be supported. In order to solve the problem, the edge computing platform should provide a method of identifying the UE between the edge application server and the 3GPP system to support the capability exposure.

In a 3GPP next-generation communication system, continuous discussion of architecture for implementing an edge computing service is taking place. The edge computing technology may be called mobile edge computing or multi-access edge computing, and is referred to as "MEC" in the disclosure for convenience. MEC may install a wireless base station or a gateway (or UPF) close to the wireless base station. Further, MEC may apply a distributed cloud computing technology to the gateway (or UPF) to provide various services and caching content near a user terminal. Accordingly, it is possible to mitigate congestion of a mobile core network and achieve low-latency communication in data communication with the UE. Further, it is possible to create a new service on the basis of the network. An MEC system may provide a cloud computing capability and an IT service environment to an application developer or a content provider in a mobile network edge. Particularly, a method of providing super low-latency and large bandwidths to applications and approaching network information in real time may be provided. Accordingly, applications providing the MEC service may provide a more rapid service to the UE when a 5G network system among mobile communication networks is used. Further, the 5G network system may provide a function by which the UE using the MEC service accesses the MEC system. Not only the 5G network system but also a 4G network system may provide the function for the MEC service.

For convenience of the description, the disclosure uses terms and names defined in the 3rd generation partnership project long term evolution (3GPP LTE). However, the disclosure is not limited to the terms and names, and may be equally applied to a system following another standard.

FIG. 1A illustrates a structure of an MEC platform which can interwork with a 3GPP mobile communication system and a connection between electronic devices according to an embodiment of the disclosure.

A network entity or network nodes according to the disclosure are described with reference to FIG. 1A. According to the disclosure, a network structure for providing the MEC service to the mobile communication UE may have the following configurations.

For example, electronic devices 110 and 120 capable of accessing a mobile communication network, for example, a 3GPP network, the 3GPP network 130, and an edge computing platform 200 for providing the MEC service, and an edge management server 140.

The electronic devices 110 and 120 capable of accessing the 3GPP network may be generally referred to as User Equipments (UEs), and may correspond to any type of electronic device capable of accessing the 3GP network 130. Hereinafter, the electronic devices 110 and 120 are referred to as UEs for convenience of description. The UEs 110 and 120 may be directly connected to the 3GPP network 130 or may be connected to the 3GPP network 130 through a wireless WiFi network. In the example of FIG. 1A, a first UE 110 and a second UE 120 are described.

A first application (App1) 111 and a second application (App2) 112 capable of receiving an NEC service using an edge computing platform may be installed within the first UE 110. The UEs 110 and 120 supporting the MEC system service may include edge enabling layers 113 and 123 within the UEs. Accordingly, the edge enabling layer 113 within the first UE 110 may be a layer mutually interworking with the edge enabling server 210 of the edge computing platform 200. A 3GPP communication layer 114 within the first UE 110 may be a layer for communication with the 3GPP network 130. Each of the first application (App1) 111 and the second application (App2) 112 included in the first UE 110 may be an application client.

In order to use the MEC service within the first UE 110, the edge enabling layer 113 may identify which application can use the MEC service. The edge enabling layer 113 may perform an operation of making a connection to a network interface such that data of a UE client application program data can be transmitted to an application server 201, 202, or 203 providing the MEC service. Further, in order to establish a data connection for using the MEC service, the edge enabling layer 113 may enable communication through a 3GPP communication layer 114. The 3GPP communication layer 114 may include a modem for using a mobile communication system and logic for processing a wireless signal. The 3GPP communication layer 114 may serve to establish a wireless connection for data communication, register a UE in a mobile communication system, establish a connection for data transmission to a mobile communication system, and transmit and receive data. The edge enabling layer 113 performs an operation for providing an edge service through the edge enabling server 210 and thus may be called an edge enabler client.

The first UE 110 may further include a wireless WiFi layer (not shown). When the first UE 110 has a wireless WiFi layer, the first UE may access the 3GPP network 130 through the wireless WiFi layer.

Within the first UE 110, only the application, the edge enabling layer 113 for enabling the MEC service, and the communication layer 114 for accessing the mobile communication system are illustrated. The first UE 110 may further include other elements.

The applications 111 and 112 of the first UE 110 means applications provided by 3rd parties. That is, they may mean client application programs executed within the first UE 110 for particular application services. Accordingly, a plurality of applications may be executed within the first UE 110. Among the applications, one or more applications may use the MEC service. The first UE 110 may include an edge enabling layer.

The second UE 120 may have a configuration that is the same as or similar to the first UE 110. In the example of FIG. 1A, the case in which a first application (App1) 121 and a third application (App3) 122 are installed in the second UE 120. The first application (App1) 111 within the first UE 110 and the first application (App1) 121 within the second UE 120 may be the same applications. The different reference numerals thereof are to identify that they are installed in the first UE 110 and the second UE 120. The edge enabling layer 123 within the second UE 120 may be a layer mutually interworking with the edge enabling server 210 of the edge computing platform 200. A 3GPP communication layer 124 within the second UE 120 may be a layer for communication with the 3GPP network 130. The 3GPP communication layer 124 may be a layer that performs a procedure for accessing the 3GPP network 130 by the second UE 110, a procedure for transmitting and receiving a data packet, and the like. The second UE 120 may also further include a wireless WiFi layer (not shown). When the second UE 120 has a wireless WiFi layer, the second UE may access the 3GPP network 130 through the wireless WiFi layer.

Subsequently, the 3GPP mobile communication network 130 may include the following network entities (functions).

The 5G-RAN 131 may be a base station providing a wireless communication function to the UE. An example of the 5G-RAN 131 is described in more detail with reference to FIG. 1B.

A Non-3GPP Inter-Working Function (N3IWF) 138 may be an interworking entity for allowing the UE to access a mobile communication network, for example, 5G network when performing access using a wireless function which is not a mobile communication network (non-3GPP) such as WiFi or the like. For example, the UEs 110 and 120 may access the N3IWF 138 through a WiFi AP (not shown), and the UEs 110 and 120 and the N3IWF 138 may establish IP secure tunnel connections. Thereafter, all signalings between the UEs 110 and 120 and the N3IWF 138 may be connected to the AMF 133 of the mobile communication network, for example, 5G network through the N3IWF 138. Further, the N3IWF 138 may establish a user plane connection with the UPF 132. Accordingly, a packet or data transmitted by the UEs 110 and 120 may be transmitted to the UPF 132 via the N3IWF 138 through a WiFi AP (not shown). Therefore, the UPF 132 may transmit a packet to a data network.

The User Plane Function (UPF) 132 may serve as a gateway for delivering a packet transmitted and received by the UE 110 or 120. The UPF 132 may be located near the edge server in order to support MEC. Through the use of the UPF 132, it is possible to directly transmit a data packet transmitted by the UE 110 or 120 to the edge network and thus achieve low-latency transmission. The UPF 132 may be connected to a data network connected through the Internet. Accordingly, the UPF 132 may route data that should be transmitted through the Internet to an Internet data network among packets transmitted by the UEs 110 and 120.

An Access and Mobility Management Function (AMF) 133 may be a network entity for managing mobility of the UE 110 or 120.

A Network Exposure Function (NEF) 134 can access information for managing the UE in the 5G network, and may subscribe to a mobility management event of the corresponding UE, subscribe to a session management event of the corresponding UE, make a request for session-related information, configure charging information of the corresponding UE, make a request for changing a PDU session policy for the corresponding UE, and transmit small data for the corresponding UE. Here, the NEF 134 is indicated as one function, but may be one network entity for performing the same. For example, the NEF 134 may be one network entity for a connection between the 3GPP network and another network. Hereinafter, the NEF 134 is described for convenience of description, but a specific server or a network device may be realized in the implementation. Accordingly, the NEF 134 may be understood as one network device.

A Policy and Charging Function (PCF) 135 may be a network entity of applying a service policy of a mobile communication service provider for the UEs 110 and 120, a charging policy, and a policy for a PDU session. Here, the PCF 135 is indicated as one function, but may be one network entity for performing the same. Hereinafter, the PCF 135 is described for convenience of description, but a specific server or network device may be realized in the implementation. Accordingly, the PCF 135 may be understood as one network device.

A Session Management Function (SMF) 136 may be a network entity of managing a connection of a packet data network for providing packet data to the UEs 110 and 120. The connection between the UEs 110 and 120 and the SMF 136 may be a PDU session. Hereinafter, the SMF 136 is described for convenience of description, but a specific server or network device may be realized in the implementation. Accordingly, the SMF 136 may be understood as one network device.

Unified Data Management (UDM) 137 may be a network entity that stores information on a subscriber. Here, the UDM 137 is indicated as one function, but may be one network entity for performing the same. Hereinafter, the UDM 137 is described for convenience of description, but a specific server or network device may be realized in the implementation. Accordingly, the UDM 137 may be understood as one network device.

Subsequently, network entities for providing an edge computing service are described.

The MEC system structure may include the UEs 110 and 120, the edge enabling server 210, and the edge management server 140. The edge enabling server 210 may be a server configuring an edge computing platform 200 of an edge data network. The edge enabling server 210 may be a server which the UE accesses to use the MEC service and may know in advance which third application server 201, 202, or 203 is operating within the corresponding edge computing platform 200. The edge enabling server 210 may perform an operation of connecting 3rd application clients of the UEs 110 and 120 and the 3rd application servers 201, 202, and 203 within the edge computing platform 200 by negotiating with the UEs 110 and 120. The edge enabling server 210 may be called an edge enabler or an edge enabler server.

The edge management server 140 performs a function for transmitting configuration information for using the MEC service to the UEs 110 and 120. The edge management server serves to configure information required for the UEs 110 and 120, and thus may be called an edge configuration server or an edge data network configuration server. In the following description, unless specially mentioned, an edge management server, an edge configuration server, or an edge data network configuration server may be used as the same meaning.

The edge management server 140 may know in advance deployment information of the edge enabling servers 210. Before using the MEC service, the UEs 110 and 120 may access the edge management server 140 to receive configuration information required for using the MEC service, for example, information on the edge enabling server 210 which should be accessed at a specific location. Further, there may be a DNS server for the MEC service. When there is a DNS server for the MEC service, the DNS server may be used to resolve an IP address of the edge enabling server 210 or resolve an IP address of the application server 201, 202, or 203 on the edge enabling server 210. The DNS server may be a network entity that may know information on the edge enabling server 210 or information on the application servers 201, 202, and 203 operating on the edge enabling server 210. According to an embodiment of the disclosure, the DNS server may exist in every edge enabling network covering a specific area. According to another embodiment of the disclosure, only one DNS server may exist in the entire MEC system. The edge management server 140 may configure information on the DNS server for each location in the UE.

Edge application servers (hereafter, referred to as Edge Apps) 201, 202, and 203 are 3rd application servers operating within the MEC system. In other words, the edge application server may be a 3rd application server operating on infra-structure provided by the edge computing platform 200. The 3rd application server may provide a service at a location close to the UE 110 or 120 and thus provide a super low-latency service. The Edge Apps 201, 202, and 203 may acquire information required for providing a service to the UE by using a capability exposure API provided by the edge computing platform 200 or provide the same to the edge computing platform 200. According to an embodiment of the disclosure, although it is illustrated that the edge enabling server 210 provides the capability exposure API to the Edge Apps 201, 202, and 203, another function within the edge computing platform 200 may provide the corresponding API. In the embodiment of FIG. 1A, the edge enabling server 210 provides the capability exposure API to the Edge Apps 201, 202, and 203 for convenience. However, another function (or entity) within the edge computing platform 200 may provide the capability exposure API to the Edge Apps 201, 202, and 203. At this time, the edge enabling server 210 may be replaced with and used as a name performing another function.

The edge management server 140 may be connected to the edge enabling server 210 and transmit information or a policy required to provide the MEC service to the UEs 110 and 120. Further, the edge management server 140 may provide information on the UEs 110 and 120 to the edge enabling server 210, so that the enabling server 201 may use the information when providing the MEC service to the UEs 110 and 120. For example, authentication/authorization information of the UEs 110 and 120, information on a service to which the UE subscribes, an ID of the UE, and the like may be transmitted to the edge enabling server 210.

Figure 1B:
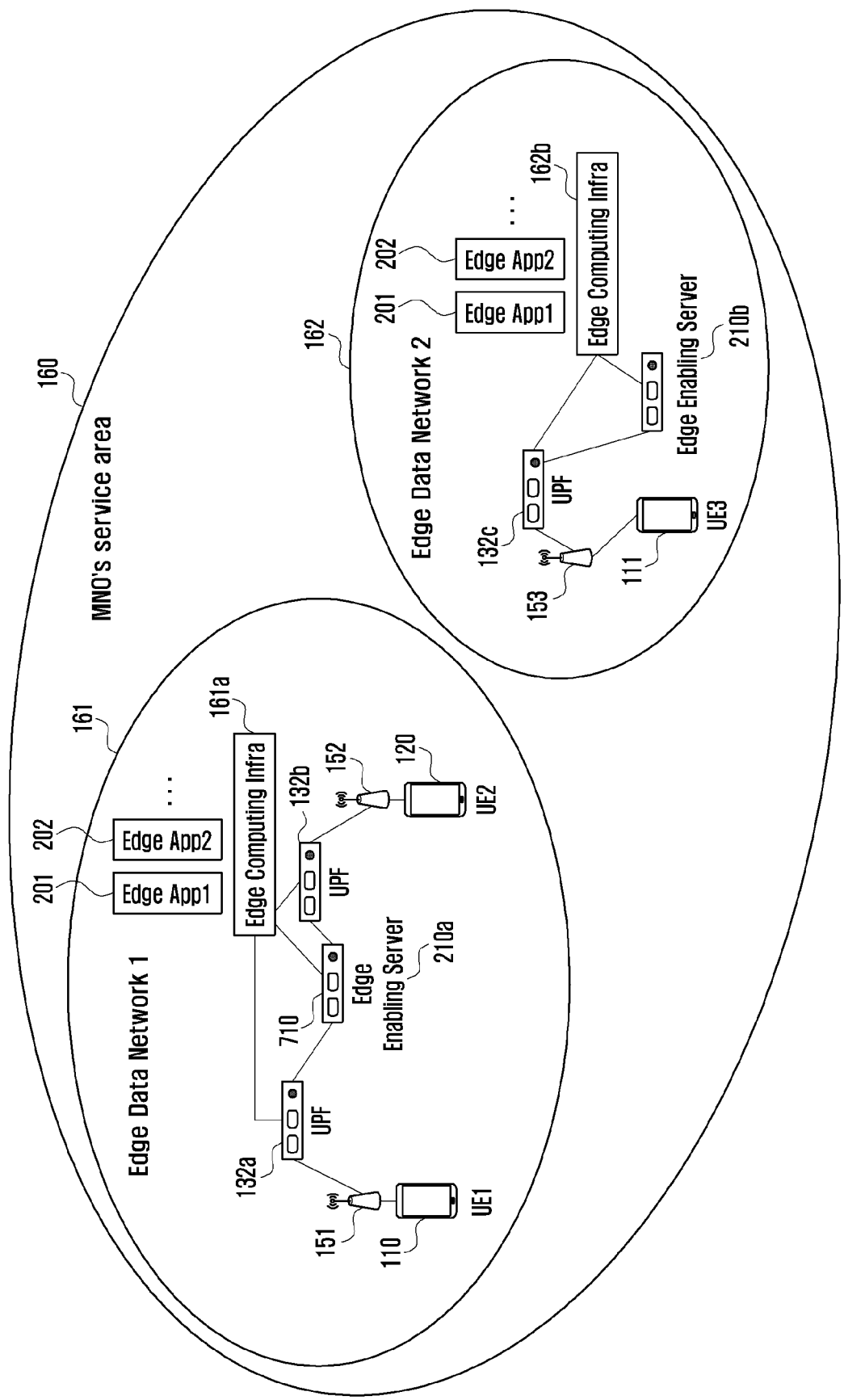
FIG. 1B illustrates deployment of a user plane of the 3GPP network and an edge data network in one service provider network according to an embodiment of the disclosure.

FIG. 1B illustrates deployment of a user plane of the 3GPP network and an edge data network in one service provider network according to an embodiment of the disclosure.

Referring to FIG. 1B, a service area 160 of a Mobile Network Operator (MNO) 160 includes a first edge data network 161 and a second edge data network 162.

First, the configuration of the first edge data network 161 is described. In the first edge data network 161, the first UE 110 and the second UE 120 may perform wireless communication through different base stations 151 and 152. The respective base stations 151 and 152 may access different UPFs 132a and 132b. However, one edge data network may have one edge enabling server 210a, and the UPFs 132a and 132b may access an edge computing infra 161a through one edge enabling server 210a located within the first edge data network 161. Further, the 3rd application servers 201 and 202 may operate on the edge computing infra 161a, and the operation may be performed as illustrated in FIG. 1A.

Subsequently, in the second edge data network 162, the third UE 111 may communicate within the network. A base station 153 included in the second edge data network 162 may be connected to the edge enabling server 210b through the UPF 132c and may be connected to the edge computing infra 162b. The 3rd application servers 2101 and 202 operating on the edge computing infra 162b may provide the MEC service to the UE 111 located within the second edge data network 162.

The edge computing infra 161a and 162b may reduce latency and load to provide an efficient service by placing UE access points to be close and may be a server providing an environment for providing a function required for the operation of the edge application.

The UEs 110 and 120 may access a mobile communication system, for example, a 5G system through a base station of a mobile communication network, for example, a 5G base station (not shown in FIG. 1A) and establish a data connection. In the following description, it is assumed that the mobile communication network is a 5G network or a 5G system. The 5G system may allocate the UPF 132 which can access the corresponding edge network in order to provide the MEC service to the UEs 110 and 120. The UEs 110 and 120 may communicate with the edge enabling server 210 through the UPF 132. Further, the UEs 110 and 120 may acquire predetermined information, for example, available Edge App information from the edge enabling server 210. Accordingly, the UEs 110 and 120 may perform data communication on the basis of the received available Edge App information. The edge enabling server 210 may perform a function of managing information on the edge application servers 201, 202, and 203, and provide information on which edge application is being executed in the current edge network to the UEs 110 and 120. Further, the edge enabling server 210 may manage a Fully Qualified Domain Name (FQDN) or an IP address required for transmitting data to the corresponding edge application server. As described above, the information managed by the edge enabling server 210 may be transmitted to an edge enabling layer of the corresponding UE.

The edge enabling server 210 may communicate with the PCF 135 or the NEF 134 of the 3GPP network and exchange predetermined information during communication. Such an information exchange is referred to as negotiation hereinafter. The edge enabling server 210 may provide information required when the UEs 110 and 120 uses the MEC service to the 5G mobile communication system via the PCF 135 or the NEF 134 through negotiation with the PCF 135 or the NEF 134 of the 3GPP network. According to another embodiment, the edge enabling server 210 may use an exposure function which the NEF 134 of the 5G mobile communication system provides to an external server through negotiation with the PCF 135 or the NEF 134 of the 3GPP network, for example, UE location reporting, UE session-related event reporting, and the like.

The edge enabling server 210 may provide a capability exposure service to the Edge App being executed in the edge computing platform 200 on the basis of the function. For example, a service of identifying the location of the UE, a service of identifying a connection state of the UE, and the like may be included. Further, the edge enabling server 210 may perform a proxy role to use an exposure function which the 3GPP network 130, for example, the NEF 134 of the 5G mobile communication system provides to the edge application servers 201, 202, and 203. According to various embodiments, the exposure function provided by the NEF 134 may be a UE mobility-related event, a session-related event, a UE traffic path change event, or the like.

According to a request from the edge application server, the edge enabling server 210 may call the exposure service provided by the NEF 134 of the 5G mobile communication system or the required network exposure function. Further, platform services provided using the 5G system, for example, reporting of a network condition, a UE traffic path change request, reporting of UE location information, and the like may be provided to the edge application servers 201, 202, and 203.

The edge enabling server 210 illustrated in FIG. 1A may be one network function (entity) providing the above-described function. Accordingly, it may be called an edge enabling function. In the disclosure, the edge enabling server is not limited to the name, and it is apparent that the edge enabling server may be a logical device, a network entity, or a network function existing for the MEC service performing a function logically handled in the disclosure.

A platform function (functionality) is not illustrated in FIG. 1A, but may be a platform function of a system to which the edge enabling servers 210 included in the edge network are connected and may correspond to an orchestration function. The platform function or the orchestration function may include a middleware application or an infrastructure service for configuring the MEC system structure. That is, an operation for deploying and distributing the edge enabling servers 210 included in the edge network, installing or injecting an edge application package in the edge enabling server 210 or operating the edge application server in the edge enabling server 210 and information on the edge application server (for example, IP address and FQDN) may be configured in the edge enabling server.

FIG. 1B illustrates the case in which a user plane of the 3GPP network and an edge data network are deployed in one service provider network according to the disclosure.

The case in which the user plane of the 3GPP network and the edge data network are deployed in one service provider network according to the disclosure and an operation of the MEC service according thereto are described in more detail with reference to FIG. 1B.

As illustrated in the first edge data network 161, a plurality of UPFs 132a and 132b of the 3GPP network may be deployed in one edge computing data network. Accordingly, one UPF close to the UE may be selected according to the location of the UE in one edge computing data network. That is, for the UE accessing the same edge computing data network to use the MEC service, a UPF serving the corresponding UE may be changed. The change in the UPF may mean a change in an IP address of the UE.

As illustrated in the second edge data network 162, one UPF 132c of the 3GPP network may be deployed in one edge computing data network. Accordingly, for one edge computing data network, one UPF may be selected. That is, in the case of the second edge data network 162, the UE accessing the second edge data network 162 to use the MEC service is only the UPF, and thus the IP address may be used without any change when the corresponding edge computing data network is used.

The UE may establish a PDU session through the 3GPP network, and the PDU session may be connected to the base station and the UPF via the UE. The UPF is connected to the edge data network, and thus may transmit data to an application server (edge application server) operating in the edge data network. Accordingly, the UE may transmit/receive data to/from at least one edge application server operating in the edge computing infra.

The UE may negotiate with the edge enabling server and receive (acquire) information on the edge application server operating in the edge data network. At this time, data on negotiation between the UE and the edge enabling server may be transmitted through the user plane of the 3GPP system, that is, the PDU session via the base station and the UPF. The edge enabling server may acquire information on edge application servers, expose a network capability to the edge application server, or expose a service for edge computing.

Figure 2:
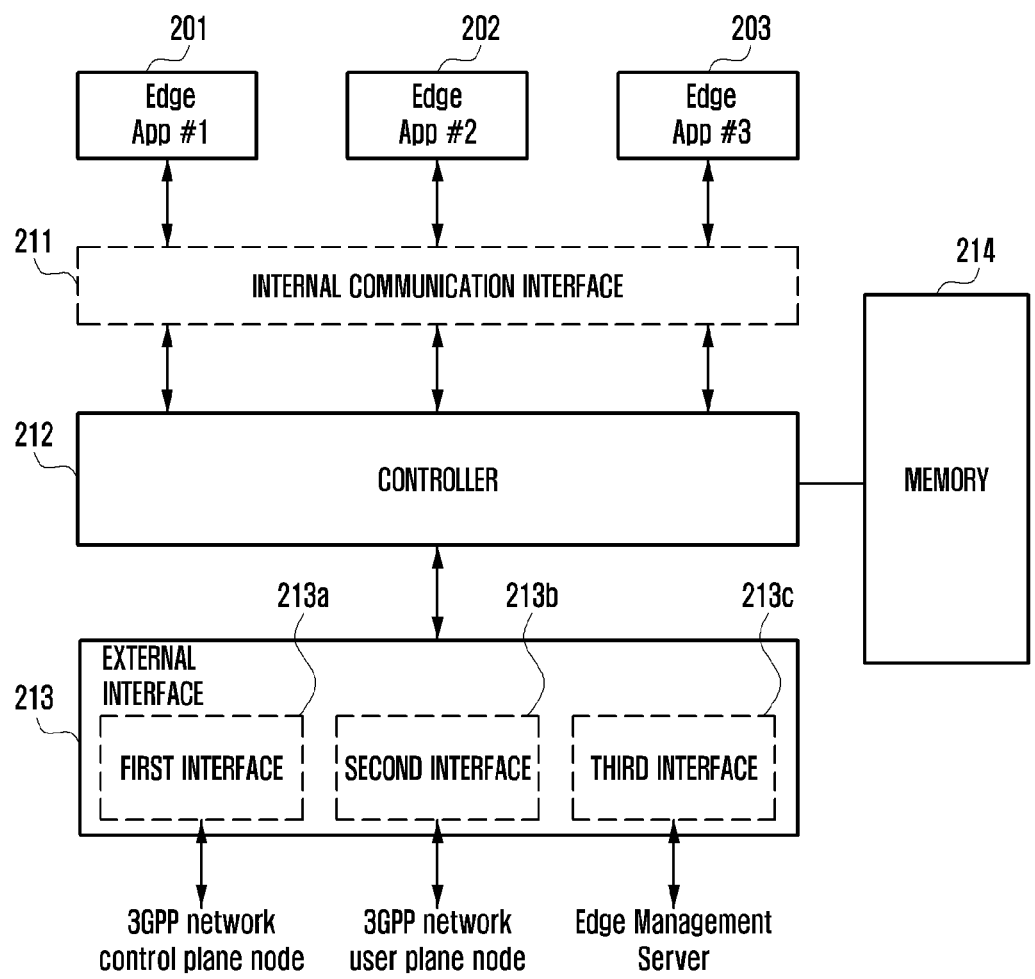
FIG. 2 is a functional block diagram of an edge enabling server according to an embodiment of the disclosure.

FIG. 2 is a functional block diagram of an edge enabling server according to an embodiment of the disclosure.

Referring to FIG. 2, the edge enabling server 210 may include an internal communication interface 211, a controller 212, an external interface 213, and a memory 214. In addition, the edge enabling server 210 may include separate devices or access devices by which an operator or a network manager controls the edge enabling server 210. Further, the edge enabling server 210 may further have other networks and additional interfaces as well as the interfaces illustrated in FIG. 2. FIG. 2 illustrates only interfaces for performing the operation according to the disclosure.

The internal communication interface 211 may interface with one or more edge application servers on the basis of the control of the controller 212. For example, the internal communication interface 211 may process data or signaling required for communication between the first edge application server 201 and the edge enabling server 210 on the basis of the control of the controller 212. In another example, the internal communication interface 211 may process data or signaling required for communication between the second edge application server 202 and/or the third edge application server 203 and the edge enabling server 210 on the basis of the control of the controller 212.

The controller 212 may control the overall operation performed by the edge enabling server 210, and may include one or more processors. The controller 212 may transmit/receive data to/from a specific edge application server through the internal communication interface 211. Further, the controller 212 may communicate with the UE and/or the 3GPP network through the external communication interface 213 and provide or acquire predetermined information. In addition, the controller 212 may control the operation performed by the edge enabling server 210 described in the disclosure.

The external interface 213 may include a first interface 213a, a second interface 213b, and a third interface 213c. The first interface 213a may communicate with at least one of control plane nodes of the 3GPP network on the basis of the control of the controller 212. The control plane nodes of the 3GPP network may be at least one of the AMF 133, the NEF 134, the PCF 135, the SMF 136, and the UDM 137 of FIG. 1A. The first interface 213a may communicate with at least one of the control plane nodes.

The second interface 213b may communicate with at least one of the user plane nodes of the 3GPP network on the basis of the control of the controller 212. For example, as illustrated in FIG. 1B, the second interface may communicate with the UPFs 132a, 132b, and 132c corresponding to the user plane nodes. Further, the second interface may communicate with the UPF corresponding to the case in which one UE moves within the same edge data network and the UPF is changed. In another example, the second interface may communicate with the UPF corresponding to the case in which one UE moves to another edge data network for example, the case in which the UE moves from the first edge data network 161 to the second edge data network 162 or from the second edge data network 162 to the first edge data network 161.

The memory 214 may temporarily store the operation required for the control of the edge enabling server 210 and data generated by the control on the basis of the control of the controller 212. Further, the memory 214 may receive data from the edge enabling server 210 described in the disclosure or store data required for transmission on the basis of the control of the controller 212. In addition, the memory 214 may store only identifier information of the UE or map the identifier information to other specific information and store the mapped information on the basis of the control of the controller 212.

Figure 3:
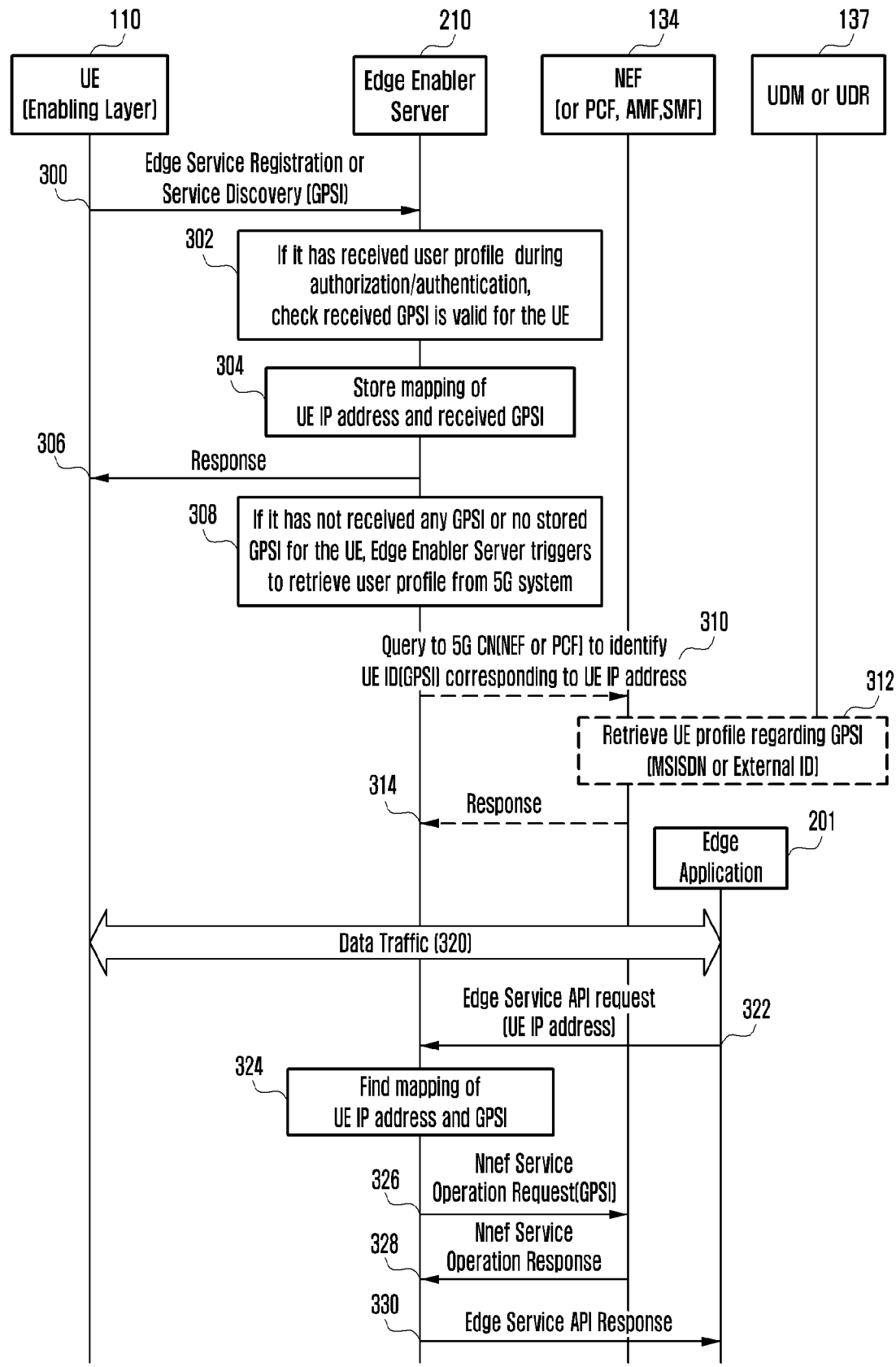
FIG. 3 is a signal flowchart illustrating a process in which the UE accesses the edge enabling server according to an embodiment of the disclosure.

FIG. 3 is a signal flowchart illustrating a process in which the UE accesses the edge enabling server according to an embodiment of the disclosure.

Referring to FIG. 3, the UE 110 is a UE including the edge enabling layer 113 as illustrated in FIGS. 1A and 1B and it is assumed that at least one application capable of receiving the MEC service according to the disclosure is installed. It is assumed that the UE 110 is a UE capable of accessing the 3GPP network 130 which is a mobile communication network.

In the disclosure, a Generic Public Subscription Identifier (GPSI) may be used as an identifier of the UE 110, which may be an identifier of the UE 110 used in the 5G system defined in the 3GPP. The GPSI may correspond to an external identifier (ID) used in the 3GPP system or a Mobile Station International ISDN Number (MSISDN) corresponding to a phone number. The external identifier is an identifier defined to identify an identifier (ID) assigned to the UE 110 by a 3rd service provider within the 3GPP mobile communication network. In the disclosure, an ID assigned to the UE 110 by an edge computing service provider may be used as the external ID within the 3GPP system. Alternatively, an edge computing service provider may make a contact with a 3GPP mobile communication service provider to pre-configure an external ID for a specific UE to be used. As described above, when the contract with the 3GPP mobile communication service provider is made in advance, the information may be stored in a subscriber information server (not shown) of the 3GPP mobile communication service provider. Alternatively, the edge computing service provider may use the MSISDN of the UE as the ID for identifying the UE.

A method of managing the identifier of the UE 110 is described on the basis of the above description with reference to FIG. 3.

According to an embodiment of the disclosure, in order to use the MEC service, the UE 110 may perform a registration procedure in the edge enabling server 210 to use the edge computing service in operation 300. The registration procedure may be performed by the generation of a message by the edge enabling layer 113 of the UE 110 and the transmission of the message to the 3GPP network 130 through the 3GPP communication layer 114. According to an embodiment of the disclosure, the 3GPP network 130 may transmit a message transmitted from the UE 110 in the registration procedure to the edge enabling server 210 and transmit a message transmitted from the edge enabling server 210 to the UE 110 through a radio channel.

According to another embodiment of the disclosure, the UE 110 may perform a service discovery procedure with the edge enabling server 210 in order to identify 3rd applications which can be used in the edge computing platform 200 which the UE accesses to use the MEC service. At this time, the UE 110 may transmit the message including the GPSI allocated to the UE to the edge enabling server 210. According to an embodiment of the disclosure, the 3GPP network 130 may transmit a message transmitted from the UE 110 in the registration procedure to the edge enabling server 210 and transmit a message transmitted from the edge enabling server 210 to the UE 110 through a radio channel.

According to an embodiment of the disclosure, the GPSI of the UE 110 may be information pre-configured in SIM information of the UE 110 or information configured in the edge enabling layer 113 of the UE 110. According to an embodiment of the disclosure, the GPSI may be a value received from the 3GPP network when the UE 110 initially accesses the 3GPP network.

According to an embodiment of the disclosure, the edge enabling server 210 may identify an ID of the UE, for example, the GPSI included in the request message received from the UE 110 in operation 302.

According to an embodiment of the disclosure, the edge enabling server 210 may receive a user profile before the operation of FIG. 3. For example, an authentication/authorization operation of the UE may be performed in advance, in which case the user profile may be received. Accordingly, the edge enabling server 210 may identify whether the GPSI identified in operation 302 is included in the profile of the UE acquired in the previously performed authentication/authorization procedure of the UE 110. The profile may be information which the edge enabling server 210 receives from the edge management server 140.

According to an embodiment of the disclosure, the edge enabling server 210 may determine whether the identified GPSI is a valid GPSI in operation 302. For example, the GPSI of the profile of the UE 110 received in the authentication/authorization procedure performed before the flowchart of FIG. 3 may be compared with the GPSI included in the message received in operation 300 and validity may be determined. For example, when the pre-received GPSI is the same as the GPSI included in the message received in operation 300, the edge enabling server 210 may identify that the GPSI is valid. On the other hand, when the pre-received GPSI is different from the GPSI included in the message received in operation 300, the edge enabling server 210 may identify that the GPSI is not valid.

According to another embodiment of the disclosure, when the edge enabling server 210 receives the profile of the UE 110 during the authentication/authorization procedure or does not receive the same from the edge management server 140, operation 302 may not be performed.

According to an embodiment of the disclosure, the edge enabling server 210 may bind an IP address of the UE 110 and GPSI information of the UE 110 on the basis of the message received in operation 300 and store the information in the memory 214 in operation 304. The information may be used to determine GPSI information of the UE 110 by the edge enabling server 210 on the basis of the IP address of the UE 110 in the future.

According to an embodiment of the disclosure, the edge enabling server 210 may transmit a response to the message received in operation 300 to the UE 110 in operation 306. According to an embodiment of the disclosure, when the GPSI information is valid and corresponds to a registration request message, the response message may be a registration approval response. According to another embodiment of the disclosure, when the GPSI information is valid and corresponds to a service discovery message, the response message may be a response message of the service type. For example, when the UE 110 performs registration, a response to the registration may be transmitted to the UE 110. In another example, when the UE 110 performs service discovery, information on a 3rd application which the UE 110 can use through the edge computing service and information for access to a 3rd application server (for example, FQDN or IP address) may be transmitted as a response message.

According to an embodiment of the disclosure, when the UE 110 performs registration, operation 306 may be performed just after the registration procedure. According to another embodiment of the disclosure, when the UE 110 performs service discovery, information on the 3rd application and information for access to the 3rd application server (for example, FQDN or IP address) may be transmitted along with the response signal.

According to an embodiment of the disclosure, the edge enabling server 210 may be operated in operation 308 when there is no information on the GPSI in the message received from the UE 110 or there is no pre-stored GPSI information. That is, the edge enabling server 210 may be operated when it cannot be determined whether the GPSI information received from the UE 110 is valid information. Accordingly, when it cannot be determined whether the GPSI information received from the UE 110 is valid information, the edge enabling server 210 may not perform operations 308 to 314.

According to an embodiment of the disclosure, in order to identify validity of the GPSI information included in the message received from the UE 110 in operation 308, the edge enabling server 210 may determine whether to transmit a request for acquiring user information from the 3GPP network 130 or determining validity of the user information.

According to an embodiment of the disclosure, when the edge enabling server 210 determines to identify validity of the GPSI transmitted by the UE 110 or determines to acquire a profile for the GPSI transmitted by the UE 110 from the 3GPP network 130, the edge enabling server may perform operation 310.

According to an embodiment of the disclosure, the edge enabling server 210 may transmit a query message for acquiring information on the UE 110 to the 3GPP network 130 in operation 310. For example, the edge enabling server 210 may transmit a request message for identifying the GPSI of the UE 110 or acquiring the profile for the GPSI of the UE 110 to the NEF 134 or the PCF 135 of the 3GPP network in operation 310. According to an embodiment of the disclosure, the edge enabling server 210 may insert an IP address of the UE 110 into the request message and transmit the request message. According to another embodiment of the disclosure, the edge enabler server 210 may further insert a service provider ID for identifying an edge computing service provider into the request message and transmit the request message.

According to an embodiment of the disclosure, when the edge enabling server 210 can directly access the PCF 135, the edge enabling server 210 may transmit the request message to the PCF 135 through an Npcf service. According to another embodiment of the disclosure, when the edge enabling server 210 cannot directly access the PCF 135, the edge enabling server may transmit a request via the NEF 134.

According to an embodiment of the disclosure, the PCF 135 of the 3GPP network 130 may have information on a session which the UE 110 is currently using. For example, the PCF 135 may have information on a session which the UE 110 is currently using through access to the edge computing data network. In this case, the PCF 135 may know the IP address which the UE 110 is using and also store the GPSI for the corresponding UE 110.

According to an embodiment of the disclosure, the case in which the PCF 135 has the corresponding information may be the case in which the PCF 135 receives information on the corresponding UE from the SMF 136 and stores the same when a PDU session for the corresponding UE is established. Further, the PCF 135 may store policy information for the MEC service and a service parameter.

According to an embodiment of the disclosure, when the edge enabling server 210 transmits a request message through the NEF 134, the NEF 134 may acquire the PCF 135 serving the IP address of the UE 110 received in operation 312 through a Binding Support Function (BSF) or using local configuration. According to an embodiment of the disclosure, the NEF 134 may configure a request received from the edge enabling server 210 according to an Npcf service operation and transmit the same to the PCF 135.

According to another embodiment of the disclosure, when the edge enabling server 210 directly transmits a request to the PCF 135, the edge enabling server 210 may discover the PCF 135 serving the corresponding IP address through the BSF. In this case, the edge enabling server 210 may directly configure a request message according to the Npcf service operation and transmit the request message to the PCF 135 in operation 312.

According to an embodiment of the disclosure, the message transmitted when the edge enabling server 210 transmits the request message to the PCF 135 through the NEF 134 or directly transmits the request message to the PCF 135 in operation 312 may be a message including information making a request for identifying the GPSI of the UE 110 or transmitting policy information or a user profile which can be used for the MEC service by the UE 110 for the IP address of the corresponding UE 110. Accordingly, the PCF 135 receiving the request message may search for the GPSI corresponding to the UE IP address in operation 312. Further, the PCF 135 may configure policy information and/or the parameter for the MEC service as a response message for the corresponding GPSI in operation 312. According to an embodiment of the disclosure, when the request message received by the PCF 135 in operation 312 includes service provider ID information, the PCF 135 may configure information in consideration of policy information and/or parameter corresponding to the service provider ID information or a profile of the UE 110.

According to an embodiment of the disclosure, the PCF 135 may directly transmit the message configured in operation 314 to the edge enabling server 210 as a response message. According to another embodiment of the disclosure, the PCF 135 may transmit the response message to the edge enabling server 210 through the NEF 134 in operation 314.

According to an embodiment of the disclosure, it may be assumed that the PCF 135 knows mapping between an external UE IP address and an internal UE IP address. The assumption may be established because an IP address used by the UE 110 inside the 3GPP network 130 and an IP address used by the UE 110 outside the 3GPP network are different from each other. This may mean that there is a Network Address Translation (NAT) function (entity) in the data connection between the inside and the outside of the 3GPP network 130.

An embodiment of the disclosure may include a method by which the PCF 135 negotiates with a server performing the NAT function to resolve the internal IP address of the UE 110. Accordingly, although the IP address of the UE 110 included in the request received by the PCF 135 is an external IP address, the PCF 135 may acquire an internal IP address of the UE 110 through the negotiation with a NAT function server (not shown). Further, the PCF 135 may acquire information on the UE 110, for example, the GPSI, policy information, or the parameter.

According to another embodiment of the disclosure, the NEF 134 may acquire profile information of the UE 110 from the UDM 137 or the UDR (not shown). In this case, the NEF 134 may make a request for informing the PCF 135 of the GPSI corresponding to the UE IP address and the PCF 135 may replay a GPSI value mapped to the UE IP address and stored to the NEF 134.

According to an embodiment of the disclosure, the NEF 134 may make a request for a user profile or a UE profile for the corresponding GPSI to the UDM 137 or the UDR by using the GPSI value received from the PCF 135 in operation 312. At this time, the NEF 134 may insert a service provider ID for identifying an edge computing service provider received from the edge enabling server 210 into the request and transmit the request to the UDN 137 or the UDR.

According to an embodiment of the disclosure, the UDM 137 or the UDR receiving the request may search for a profile of the UE 110 corresponding to the received GPSI, generate a message to be replied to the NEF 134 on the basis of the found information, and transmit the message to the NEF 134.

According to another embodiment of the disclosure, the UDM 137 or the UDR may search for a profile of the UE 110 corresponding to the service provider ID included in the request from the NEF 134, configure a response message, and then reply the response message to the NEF 134.

According to an embodiment of the disclosure, the NEF 134 receiving the response message according to the above-described method may transmit the response message to the edge enabling server 210 in operation 314. According to an embodiment of the disclosure, the response message may include the GPSI of the corresponding UE 110 or profile information required by the corresponding UE 110 to use the MEC service.

According to an embodiment of the disclosure, the edge enabling server 210 receiving the response in operation 314 may identify whether the GPSI received from the corresponding UE 110 in operation 300 is the same as the GPSI received from the 3GPP network 130. When the two GPSIs are the same as each other, the edge enabling server 210 may determine that the received GPSI received from the UE 110 in operation 300 is a valid GPSI and store the GPSI in the memory 214. According to an embodiment of the disclosure, the edge enabling server 210 may map the valid GPSI to the IP address and store the mapped information in the memory 214.

According to another embodiment of the disclosure, the edge enabling server 210 may receive a profile for the corresponding GPSI, policy information, or a service parameter from the 3GPP network 130. In this case, the edge enabling server 210 may apply the same to the service for the UE 110. For example, a premium subscriber may be identified to use all services of the MEC service and the corresponding information may be stored in the memory 214. According to an embodiment of the disclosure, a premium service may be a service which is not applied to a general subscriber.

According to an embodiment of the disclosure, through the operation described above, the edge application server 201 and the UE 110 may transmit/receive data traffic in operation 320.

Hereinafter, the edge application server is described using the first edge application server 210, and ordinal numbers such as first, second, and the like for distinguishing application servers or identifying applications installed in the UE 110 are not used for convenience of description.

According to an embodiment of the disclosure, the edge application server 201 may call an edge service API provided by the edge enabling server 210 to the edge enabling server 210 in operation 322. In the specification according to the disclosure, the edge service API may be an API that provides a capability exposure function for an edge computing service to the 3rd application server 201 operating in edge computing infrastructure of the edge data network to which the edge enabling server 210 belongs. For example, there may be a location API for detecting the location of the UE 110, a management API for managing resources of the UE 110, and a traffic steering API for modifying a data path of the UE 110.

According to an embodiment of the disclosure, the edge application server 201 may detect edge service APIs provided by the edge enabling server 210 through an API discovery procedure or a Common API Framework (CAPIF) function. According to an embodiment of the disclosure, when making a request for the edge service API to the edge enabling server 210, the edge application server 201 may include the IP address of the UE 110 which accessed itself since the edge application server cannot know the identifier of the UE 110.

According to an embodiment of the disclosure, the edge enabling server 210 may acquire the identifier of the UE 110 corresponding to the IP address of the UE 110 received from the edge application server 201, that is, the GPSI from a mapping table in operation 324. Mapping information described in the specification according to the disclosure may be information acquired through operation 302 to operation 314 and stored in the memory 214 of the edge enabling server 210.

According to an embodiment of the disclosure, after acquiring the GPSI on the basis of the mapping information, the edge enabling server 210 may call a 3GPP network capability exposure API for supporting the edge service API requested by the edge application server 201 on the basis of the ID of the UE 110 in operation 326. Further, according to an embodiment of the disclosure, the edge enabling server 210 may transmit a request to the NEF 134 in operation 326.

According to an embodiment of the disclosure, the edge enabling server 210 may configure the GPSI as the ID of the UE 110 and transmit a service operation request message to the NEF 134. According to another embodiment of the disclosure, when the edge enabling server 210 is a network entity which is reliable in the 3GPP network, the service operation request message may be directly transmitted to the AMF 133, the SMF 136, or the PCF 135.

According to an embodiment of the disclosure, whether the edge enabling server 210 transmits the service operation request message to the AMF 133, the SMF 136, or the PCF 135 may be determined according to the type of the 3GPP network capability exposure to be used by the edge enabling server 210. For example, when information on the location of the UE 110 is desired, it may be determined to transmit the service operation request message to the AMF 133. According to an embodiment of the disclosure, when the service operation request message is directly transmitted to the AMF 133, the SMF 136, or the PCF 135, the edge enabling server 210 may use the GPSI information acquired as the ID of the UE 110 in operation 324.

According to an embodiment of the disclosure, the NEF 134, the AMF 133, the SMF 136, or the PCF 135 receiving the service operation request message may perform a capability exposure operation for the corresponding UE 110 according to the request. The NEF 134, the AMF 133, the SMF 136, or the PCF 135 may transmit the result to the edge enabling server 210 in operation 328.

According to an embodiment of the disclosure, in operation 328, the edge enabling server 210 receiving the message may generate an edge service API response message on the basis of the result according to the API requested by the edge application server 201 in operation 322. Accordingly, the edge enabling server 210 may transmit the generated edge service API response message to the edge application server 201 in operation 330.

According to the description of FIG. 3, when accessing the edge enabling server 210, the UE 110 may use and register the GPSI used in the 3GPP network as its own ID, and the edge enabling server 210 may support the capability exposure API in the edge application server using the network capability exposure provided by the system of the 3GPP network 130.

Figure 4:
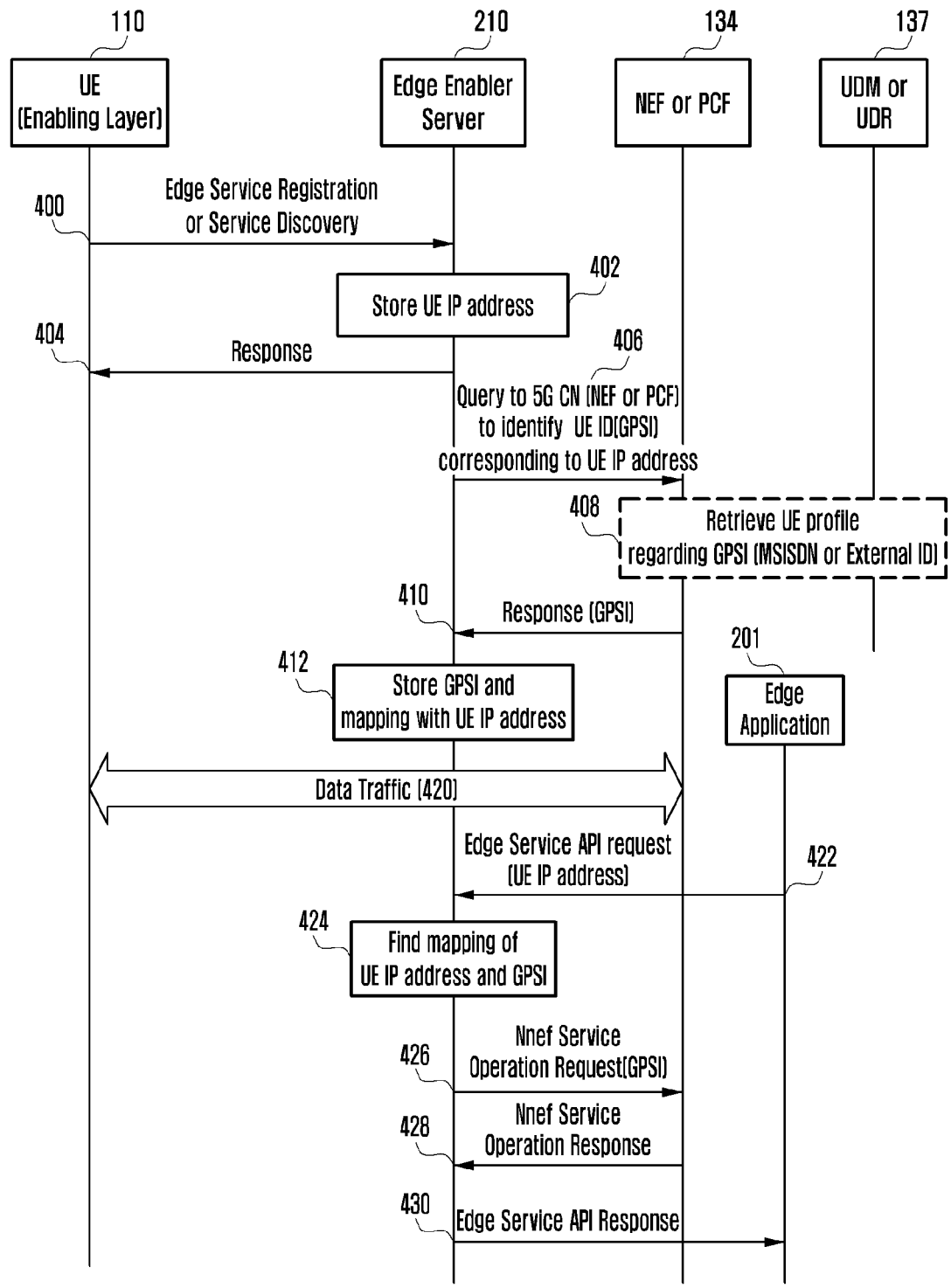
FIG. 4 is a signal flowchart illustrating a process of providing an edge application service to a mobile communication UE through the edge enabling server according to an embodiment of the disclosure.

FIG. 4 is a signal flowchart illustrating a process of providing an edge application service to a mobile communication UE through the edge enabling server according to an embodiment of the disclosure.

In a brief description of the overall operation of FIG. 4, when the UE 110 accesses the edge enabling server 210, the edge enabling server 210 may acquire a GPSI of the corresponding UE through signaling with the 3GPP network 130 on the basis of the IP of the UE. Thereafter, the edge enabling server 210 may support a capability exposure API to the edge application server 201 by using the network capability exposure provided by the 3GPP network 130 on the basis of the acquired information.

In the disclosure, a Generic Public Subscription Identifier (GPSI) may be used as an identifier of the UE, which may be an identifier of the UE used in the 5G system defined in the 3GPP. The GPSI may correspond to an external identifier (ID) used in the 3GPP system or a Mobile Station International ISDN Number (MSISDN) corresponding to a phone number. The external identifier is an identifier defined to identify an identifier (ID) assigned to the UE 110 by a 3rd service provider within the 3GPP mobile communication network. In the disclosure, an ID assigned to the UE 110 by an edge computing service provider may be used as the external ID within the 3GPP system. Alternatively, an edge computing service provider may make a contact with a 3GPP mobile communication service provider to pre-configure an external ID for a specific UE to be used. As described above, when the contract with the 3GPP mobile communication service provider is made in advance, the information may be stored in a subscriber information server (not shown) of the 3GPP mobile communication service provider. Alternatively, the edge computing service provider may use the MSISDN of the UE as the ID for identifying the UE.

Hereinafter, the edge application server is described using the first edge application server 201 and ordinal numbers such as first, second, and the like for distinguishing application servers or identifying applications installed in the UE 110 are not used for convenience of description.

Hereinafter, the edge application server is described using the first edge application server 210, and order numbers such as first, second, and the like for distinguishing application servers or identifying applications installed in the UE 110 are not used for convenience of description.

According to an embodiment of the disclosure, in order to use the MEC service, the UE 110 may perform a registration procedure in the edge enabling server 210 to use the edge computing service in operation 400. According to another embodiment of the disclosure, the UE 110 may perform a service discovery procedure with the edge enabling server 210 in order to identify 3rd applications which can be used in the edge computing platform 200 which the UE accesses to use the MEC service.

According to an embodiment of the disclosure, in operation 402, the edge enabling server 210 may store the IP address of the UE 110 transmitting the message of operation 400. According to an embodiment of the disclosure, information on the IP address of the UE 110 may be used to acquire and store GPSI information of the UE 110 by the edge enabling server 210 on the basis of the IP address of the UE 110 in the future.

According to an embodiment of the disclosure, in operation 404, the edge enabling server 210 may transmit a response to the message of operation 400 to the UE 110. According to an embodiment of the disclosure, when the UE 110 performs registration, a response thereto may be transmitted. According to another embodiment of the disclosure, when the UE 110 performs service discovery, the edge enabling server 210 may insert information on the 3rd application server which can be used by the UE 110 through the edge computing service and information for accessing to the 3rd application server 201 (for example, FQDN or IP address) into the response message and transmit the response message.

According to an embodiment of the disclosure, for the IP address transmitted by the UE 110 in operation 400, the edge enabling server 210 may determine whether to transmit a request to the 3GPP network 130 in order to acquire user information corresponding to the corresponding IP address, for example, the GPSI and profile information corresponding thereto in operation 406.

According to an embodiment of the disclosure, the edge enabling server 210 may transmit a request message for identifying the GPSI of the UE 110 or acquiring a profile for the GPSI of the UE 110 to the NEF 134 or the PCF 135 in operation 406. According to an embodiment of the disclosure, the edge enabling server 210 may insert the IP address of the UE 110 into the request message. According to another embodiment of the disclosure, the edge enabling server 210 may include a service provider ID for identifying an edge computing service provider.

According to an embodiment of the disclosure, when the edge enabling server 210 can directly access the PCF 135, the edge enabling server 210 may transmit a request message to the PCF 135 through an Npcf service. According to another embodiment of the disclosure, when the edge enabling server 210 cannot directly access the PCF 135, the edge enabling server may transmit the request message through the NEF 134.

According to an embodiment of the disclosure, the PCF 135 may have information on a session which the UE 110 is currently using. For example, the PCF 135 may have information on a session which the UE 110 is currently using through access to the edge computing data network. Accordingly, the PCF 135 may know the IP address used by the UE 110. Further, the PCF 135 may store the GPSI for the corresponding UE 110. The PCF 135 may receive the information from the SMF 136 and store the same when a PDU session is established. Further, the PCF 135 may store policy information for the MEC service and a service parameter.

According to an embodiment of the disclosure, when the edge enabling server 210 transmits a request message through the NEF 134, the NEF 134 may acquire the PCF 135 serving the IP address of the UE 110 received in operation 408 through a Binding Support Function (BSF) or using local configuration. As a result, the NEF 134 may discover the PCF 135 serving the UE 110. Accordingly, the NEF 134 may generate a response message of the request received from the edge enabling server 210 according to the service operation of the NPCF 135 and transmit the response message to the PCF 135.

According to another embodiment of the disclosure, when the edge enabling server 210 directly transmits the request to the PCF 135, the edge enabling server 210 may acquire information on the PCF 135 serving the corresponding IP address through the BSF. The edge enabling server 210 may directly configure and transmit the request message to the PCF 135 according to the Npcf service operation.

According to an embodiment of the disclosure, the request message which the edge enabling server 210 transmits to the PCF 135 through the NEF 134 or the edge enabling server 210 directly transmits to the PCF 135 may be a request for identifying the GPSI of the UE 110 or a request message for transmitting policy information or a user profile which can be used by the UE 110 for the MEC service with respect to the IP address of the corresponding UE.

According to an embodiment of the disclosure, the PCF 135 receiving the request may acquire the GPSI corresponding to the IP address of the UE. According to another embodiment of the disclosure, the PCF 135 may configure policy information or a parameter for the MEC service with respect to the corresponding GPSI. According to another embodiment of the disclosure, when the request message received by the PCF 135 includes service provider ID information, the PCF 135 may configure a response message by policy information, a parameter, or a profile of the UE 110 corresponding to the service provider ID.

According to an embodiment of the disclosure, the PCF 135 may configure the information as a response message and transmit the response message to the edge enabling server 210 in operation 410.

According to another embodiment of the disclosure, when the message cannot be directly transmitted to the edge enabling server 210, the PCF 135 may transmit the response message to the edge enabling server 210 through the NEF 134 in operation 410.

According to an embodiment of the disclosure, it may be assumed that the PCF 135 knows mapping between an external UE IP address and an internal UE IP address. This is because the IP address used by the UE 110 inside the 3GPP network 130 and the IP address used by the UE 110 outside the 3GPP network 130 may be different. According to an embodiment of the disclosure, a Network Address Translation (NAT) function (or entity) may exist in a data connection between the inside and the outside of the 3GPP network 130.

An embodiment of the disclosure may include a method by which the PCF 135 negotiates with a server performing the NAT function to resolve the external IP address of the UE 110. According to an embodiment of the disclosure, the IP address of the UE 110 included in the request message received from the edge enabling server 210 is an external IP address, but the PCF 135 may acquire an internal IP address of the UE 110 through negotiation with a NAT function server. According to an embodiment of the disclosure, the PCF 135 may further identify information on the UE 110 (GPSI, policy information, or parameter).

According to another embodiment of the disclosure, the NEF 134 may acquire profile information of the UE 110 from the UDM 137 or the UDR (not shown in FIGS. 1A and 1B) in operation 408. In this case, the NEF 134 may make a request for informing the PCF 135 of the GPSI corresponding to the UE IP address and the PCF 135 may replay a GPSI value stored for the UE corresponding to the UE IP address to the NEF 134. According to an embodiment of the disclosure, the NEF 134 may make a request for a user profile or a UE profile for the corresponding GPSI to the UDM 137 or the UDR by using the GPSI value received from the PCF 135. At this time, the NEF 134 may insert a service provider ID for identifying an edge computing service provider received from the edge enabling server 210 into a request message and transmit the request message to the UDN 137 or the UDR.

According to an embodiment of the disclosure, the UDM 137 or the UDR receiving the request message from the NEF 134 may acquire a profile of the UE 110 corresponding to the received GPSI, generate information including the profile as a response message, and transmit the response message to the NEF 134.

According to another embodiment of the disclosure, the UDM 137 or the UDR may acquire a profile of the UE 110 corresponding to the service provider ID included in the request from the NEF 134, configure information including the profile as a response message, and then transmit (reply) the response message to the NEF 134. Accordingly, the NEF 134 receiving the response message from the UDM 137 or the UDR may transmit the response message to the edge enabling server 210 in operation 410. As described above, the response message may include the GPSI of the corresponding UE 110 or profile information required when the corresponding UE 110 uses the MEC service.

According to an embodiment of the disclosure, in operation 412, the edge enabling server 210 receiving the response message may map the IP address which the corresponding UE 110 transmitted in operation 400 and the GPSI received from the 3GPP system and store the mapped information in the memory 214. The mapping information may configure and store a mapping table for each application server or each UE.

According to an embodiment of the disclosure, when a profile for the GPSI of the corresponding UE, policy information, or a service parameter is received from the 3GPP network 130, the edge enabling server 210 may apply the same to the service for the UE 110. For example, the edge enabling server 210 may configure a premium subscriber to use all services of the MEC service. A premium service may be a service which is not applied to a general subscriber.

According to an embodiment of the disclosure, as described above, when the UE 110 completes the registration procedure through the edge enabling server 210 or completes the search for the edge application server, the UE may perform data communication with the edge application server 201 in operation 420.

According to an embodiment of the disclosure, the edge application server 201 may call an edge service API provided by the edge enabling server 210 to the edge enabling server 210. In the specification according to the disclosure, the edge service API may be an API that provides a capability exposure function for an edge computing service to the 3rd application server 201 operating in infrastructure of the edge data network to which the edge enabling server 210 belongs. For example, there may be a location API for detecting the location of the UE 110, a management API for managing resources of the UE 110, and a traffic steering API for modifying a data path of the UE 110.

According to an embodiment of the disclosure, the edge application server 201 may detect edge service APIs provided by the edge enabling server 210 through an API discovery procedure or a Common API Framework (CAPIF) function. When making a request for the edge service API to the edge enabling server 210, the edge application server 201 may include the IP address of the UE 110 which accessed itself since the edge application server cannot know the identifier of the UE 110.

According to an embodiment of the disclosure, in operation 424, the edge enabling server 210 receiving the request may acquire (search for) the IP address of the UE 110 included in the previously received request message and the ID of the UE 110, that is, the GPSI corresponding thereto on the basis of the mapping information stored in operation 412.

According to an embodiment of the disclosure, the edge enabling server 210 may call a 3GPP network capability exposure API for supporting the edge service API requested by the edge application server 201 in operation 422 by using the mapped GPSI information as the ID of the UE 110 in operation 426. For example, the edge enabling server 210 may transmit a request message to the NEF 134. According to an embodiment of the disclosure, the edge enabling server 210 may configure the GPSI as the ID of the UE 110 in the request message and transmit the request message. According to another embodiment of the disclosure, when the edge enabling server 210 is a device reliable in the 3GPP network 130, the request may be directly transmitted to the AMF 133, the SMF 136, or the PCF 135.

According to an embodiment of the disclosure, whether the edge enabling server 210 transmits the service operation request message to the AMF 133, the SMF 136, or the PCF 135 may be determined according to the type of the 3GPP network capability exposure to be used by the edge enabling server 210. According to an embodiment of the disclosure, when the request message to be transmitted by the edge enabling server 210 desires information on the location of the UE 110, the edge enabling server 210 may determine to transmit the request message to the AMF 133. According to an embodiment of the disclosure, when directly transmitting the request to the AMF 133, the SMF 136, or the PCF 135, the edge enabling server 210 may use the GPSI information acquired as the ID of the UE 110 in operation 424.

According to an embodiment of the disclosure, the NEF 134, the AMF, the SMF 136, or the PCF 135 receiving the request message in operation 426 may perform a capability exposure operation for the corresponding UE 110 according to the request message. According to an embodiment of the disclosure, the NEF 134, the AMF, the SMF 136, or the PCF 135 performing the capability exposure operation for the corresponding UE 110 according to the request message may generate the result as a response message and transmit the response message to the edge enabling server 210 in operation 428.

According to an embodiment of the disclosure, the edge enabling server 210 receiving the response message may generate the result according to the API requested by the edge application server 201 in operation 422 as a response message to be transmitted to the edge application server 201 in operation 430. Thereafter, the edge enabling server 210 may transmit the response message generated in operation 430 to the edge application server 201.

Through the above operation, the edge application server 201 may acquire edge service API information provided by the edge enabling server 210.

Figure 5:
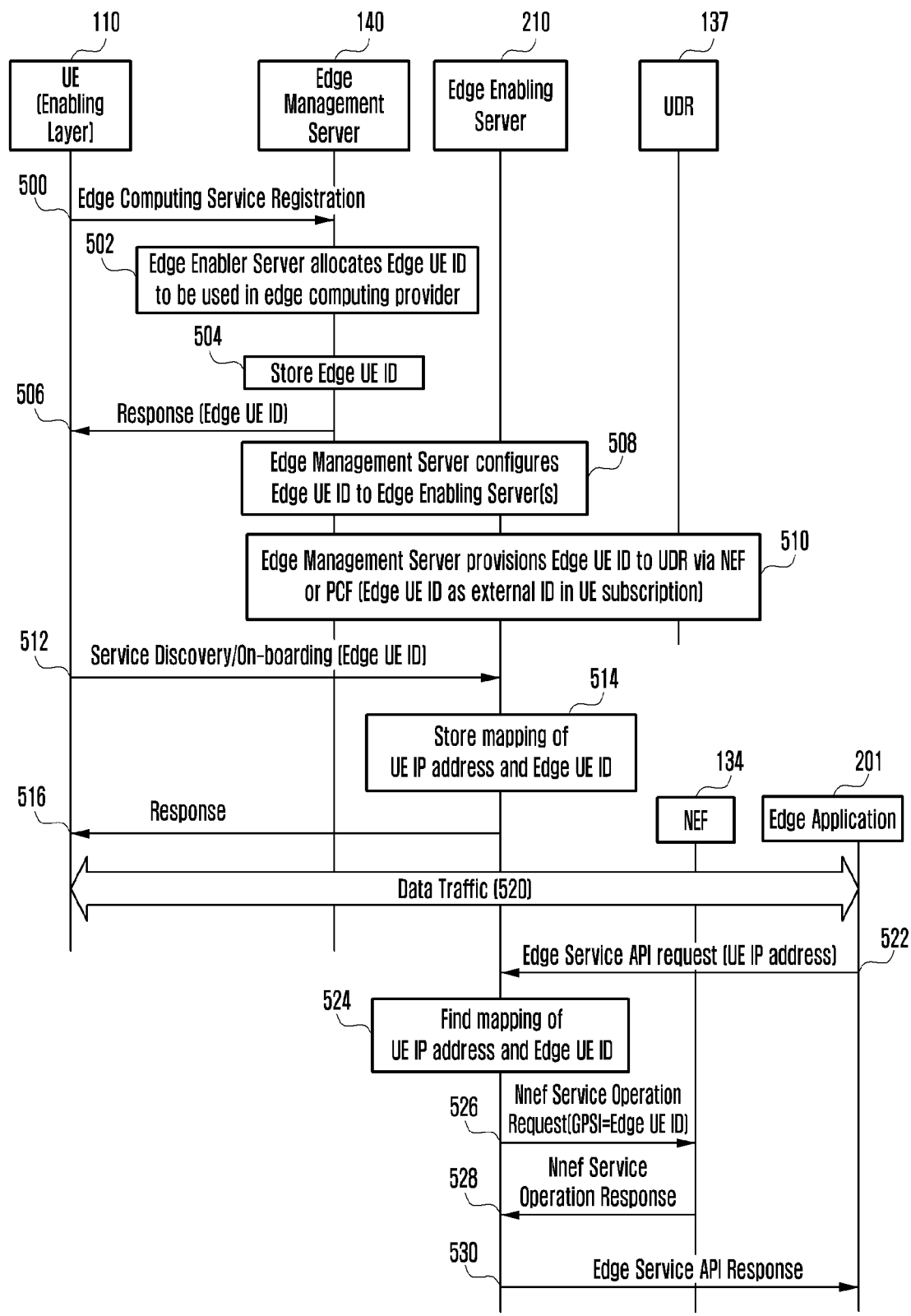
FIG. 5 is a signal flowchart illustrating a process of providing an edge computing service using an identifier allocated to the UE in the MEC network according to an embodiment of the disclosure.

FIG. 5 is a signal flowchart illustrating a process of providing an edge computing service using an identifier allocated to the UE in the MEC network according to an embodiment of the disclosure.

In a brief description of the overall operation of FIG. 5, when the UE performs a registration procedure in the edge management server 140 operating in the edge computing platform 200, an identifier (ID) of the UE 110 may be allocated. Thereafter, the edge management server 140 may register the ID as the GPSI used in the 3GPP network 130. On the basis thereof, the edge enabling server 210 may support a capability exposure API to the edge application server 201 by using the network capability exposure provided by the 3GPP network 130.

In an embodiment of the disclosure, an edge UE ID may be used as the ID of the UE. This may be an ID used for identifying the UE in the edge computing platform 200 which the UE accesses and may be an ID allocated to the UE by the edge management server 140 of the edge computing platform 200. When the ID is provided to the 3GPP network 130, it may be provided in the form of a Generic Public Subscription Identifier (GPSI).

The ID may be an identifier of the UE used in the 5G system defined in the 3GPP. The GPSI may correspond to an external identifier (ID) used in the 3GPP system or a Mobile Station International ISDN Number (MSISDN) corresponding to a phone number. The external identifier is an identifier defined to identify an identifier (ID) assigned to the UE 110 by a 3rd service provider within the 3GPP mobile communication network. In the disclosure, an ID assigned to the UE 110 by an edge computing service provider may be used as the external ID within the 3GPP system. Alternatively, an edge computing service provider may make a contact with a 3GPP mobile communication service provider to pre-configure an external ID for a specific UE to be used. As described above, when the contract with the 3GPP mobile communication service provider is made in advance, the information may be stored in a subscriber information server (not shown) of the 3GPP mobile communication service provider. Alternatively, the edge computing service provider may use the MSISDN of the UE as the ID for identifying the UE.

Hereinafter, the edge application server is described using the first edge application server 201 and ordinal numbers such as first, second, and the like for distinguishing application servers or identifying applications installed in the UE 110 are not used for convenience of description According to an embodiment of the disclosure, in order to use the MEC service, the UE 110 may perform a registration procedure in the edge enabling server 140 to use the edge computing service in operation 500.

According to an embodiment of the disclosure, the edge management server 140 receiving a registration request message from the UE 110 may allocate an edge UE ID which can be used in the edge computing platform 200 which the UE 110 currently accesses in operation 502.

According to an embodiment of the disclosure, the edge management server 140 may store the allocated edge UE ID in an internal memory in operation 504. The edge management server 140 may bind the information and an IP address of the UE 110 transmitting the message in operation 500 and store the information in the memory.

According to an embodiment of the disclosure, the edge management server 140 may transmit a response message of the registration request transmitted by the UE 110 to the UE 110. At this time, the response message may include the edge UE ID allocated to the UE 110. According to an embodiment of the disclosure, the edge enabling layer 113 of the UE 110 may determine that the ID is an ID which the edge enabling layer should use for the corresponding edge computing service, and the ID may be stored in the internal memory or the edge enabling layer 113. According to an embodiment of the disclosure, the edge enabling layer 113 of the UE 110 may use the information as its own ID for the API request message transmitted to the edge management server 140 or the edge enabling server 210 in the future.

According to an embodiment of the disclosure, the edge management server 140 may transmit the edge UE ID successfully allocated to the UE 110 to the edge enabling servers 210 within the same edge computing platform 200 in operation 508. According to an embodiment of the disclosure, since the UE 110 may select and access the edge enabling server 210 according to its own location, the ID of the UE 110 may be transmitted to the edge enabling servers 210 belonging to an area managed by the edge computing platform 200 and thus the UE 110 may be identified when the UE 110 accesses the edge enabling server 210 by using the corresponding ID in the future. According to an embodiment of the disclosure, when transmitting the edge UE ID to the edge enabling server 210, the edge management server 140 may also transmit a service profile or configuration information to be applied to the corresponding UE 110.

According to an embodiment of the disclosure, the edge management server 140 may perform an operation for configuring the edge UE ID allocated to the UE 110 as an external ID of the 3GPP network 130 or the GPSI in operation 510. According to an embodiment of the disclosure, the edge management server 140 may transmit a request message for inserting the edge UE ID allocated by the edge management server into subscription information of the UE 110 through the NEF 134. According to an embodiment of the disclosure, the NEF 134 may insert the edge UD ID allocated by the edge management server 140 into the subscription information of the UE 110 and store the subscription information in the UDR 137.

According to an embodiment of the disclosure, for the IP address of the UE 110 acquired in operation 500, the edge management server 140 may transmit information indicating the use of the edge UE ID allocated by the edge management server 140 as the GPSI using the corresponding IP address to the PCF 135. Accordingly, the PCF 135 may configure and store the edge UE ID as the GPSI corresponding to the IP address of the UE 110 and the received edge UE ID as the GPSI of the UE 110 identified by the corresponding IP address. According to an embodiment of the disclosure, the PCF 135 may store the edge UE ID received as the GPSI of the UE 110 in the UDR 137.

According to an embodiment of the disclosure, the edge management server 140 may register the edge UE ID allocated to the UE 110 in a subscriber server or a policy server of the 3GPP network 130 as the GPSI of the UE 110 in operation 510. Now, the 3GPP network 130 may recognize a value corresponding to the edge UE ID as the GPSI and identify the UE 110.

According to an embodiment of the disclosure, the UE 110 may perform a service discovery procedure in the edge enabling server 210 to receive information on an application by which the UE can use the MEC service. According to another embodiment of the disclosure, the UE 110 may perform a service on-boarding procedure in the edge enabling server 210 to transmit information on an application to be used for the MEC service by the UE in operation 512. According to an embodiment of the disclosure, the UE 110 may use the edge UE ID allocated as its own ID in operation 506 in the messages transmitted to the edge enabling server 210.

According to an embodiment of the disclosure, the edge enabling server 210 may bind the edge UE ID included in the request message transmitted by the UE 110 and the ID address of the UE 110 acquired in an IP packet transmitted by the UE 110 and store the information in the memory 214 in operation 514. Accordingly, when becoming aware of the IP address of the UE 110, the edge enabling server 210 may identify the edge UE ID corresponding thereto.

According to an embodiment of the disclosure, the edge enabling server 210 may generate a response message corresponding to the request message transmitted by the UE 110 in operation 512 and transmit the response message to the UE 110 in operation 516. According to an embodiment of the disclosure, when the UE 110 makes a request for service discovery, the edge enabling server 210 may transmit information on the edge application server 201 which can be used by the UE 110. According to an embodiment of the disclosure, information on the edge application servers may be configured in a list form, and may include at least one of IDs of applications which can be used by the UE 110, FQDNs for access to the corresponding application servers, IP addresses, or other information for identifying UEs.

According to another embodiment of the disclosure, when the UE 110 makes a request for service on-boarding, the edge enabling server 210 may provide information on the edge application server 201 of which the use is requested by the UE 110. The information on the edge application server 201 may include at least one of the IP address of the edge application server 201, the FQDN, and the DNS server information which can resolve the FQDN.

Through the above operation, the UE 110 may acquire information on the edge application servers from the edge enabling server 210 and register identifier information to be used by the UE. The UE 110 may perform transmission and reception of data traffic to and from the edge application server 201 by using the information in operation 520.

According to an embodiment of the disclosure, the edge application server 201 may call an edge service API provided by the edge enabling server 210 to the edge enabling server 210 in operation 522. In the specification of the disclosure, the edge service API may be an API that provides a capability exposure function for an edge computing service to the 3rd application server operating in infrastructure of the edge data network to which the edge enabling server 210 belongs. For example, there may be a location API for detecting the location of the UE 110, a management API for managing resources of the UE 110, and a traffic steering API for modifying a data path of the UE 110. The edge application server 201 may detect edge service APIs provided by the edge enabling server 210 through an API discovery procedure or a Common API Framework (CAPIF) function. According to an embodiment of the disclosure, since the edge application server 201 does not know the ID of the UE 110 when transmitting the edge service API request message to the edge enabling server 210, the edge application server 201 may transmit the edge service API request message including the IP address of the UE 110 used when the UE 110 accesses the edge application server 201.

According to an embodiment of the disclosure, the edge enabling server 210 receiving the edge service API request message including the IP address of the UE 110 may acquire the IP address of the UE 110 included in the edge service API request message including the IP address of the UE 110 received in operation 524 and the ID of the UE 110 corresponding thereto, that is, the edge UE ID on the basis of the mapping information stored in operation 514.

According to an embodiment of the disclosure, the edge enabling server 210 may call a 3GPP network capability exposure API for supporting the edge service API requested by the edge application server 201 in operation 522 by using the mapped edge UE ID as the ID of the UE 110 in the form of a GPSI in operation 526. According to an embodiment of the disclosure, the edge enabling server 210 may transmit a request message for calling the 3GPP network capability exposure API to the NEF 134 of the 3GPP network 13. According to an embodiment of the disclosure, the edge enabling server 210 may insert the GPSI into the request message for calling the 3GPP network capability exposure API as the ID of the UE 110 and transmit the request message. According to another embodiment of the disclosure, when the edge enabling server 210 is a device reliable in the 3GPP network 130, the request message for calling the 3GPP network capability exposure API may be directly transmitted to the AMF 133, the SMF 136, or the PCF 135.

According to an embodiment of the disclosure, whether the edge enabling server 210 transmits the request message for calling the 3GPP network capability exposure API to the AMF 133, the SMF 136, or the PCF 135 may be determined according to the type of the 3GPP network capability exposure to be used by the edge enabling server 210. For example, when information related to the location of the UE 110 is desired, it may be determined to transmit the request message to the AMF. When directly transmitting the request message to the AMF 133, the SMF 136, or the PCF 135, the edge enabling server 210 may use the GPSI information stored as the ID of the UE 110 in operation 514.

According to an embodiment of the disclosure, the NEF 134, the AMF 133, the SMF 136, or the PCF 135 receiving the request message for calling the 3GPP network capability exposure API may perform a capability exposure operation for the corresponding UE 110 according to the request. According to an embodiment of the disclosure, the NEF 134, the AMF, the SMF, or the PCF 135 may transmit a capability exposure operation result message to the edge enabling server 210 in operation 528. The edge enabling server 210 receiving the capability exposure operation result message in operation 528 may generate the result according to the API requested by the edge application server 201 as an edge service API response message and transmit the edge service API response message to the edge application server 201.

Figure 6:
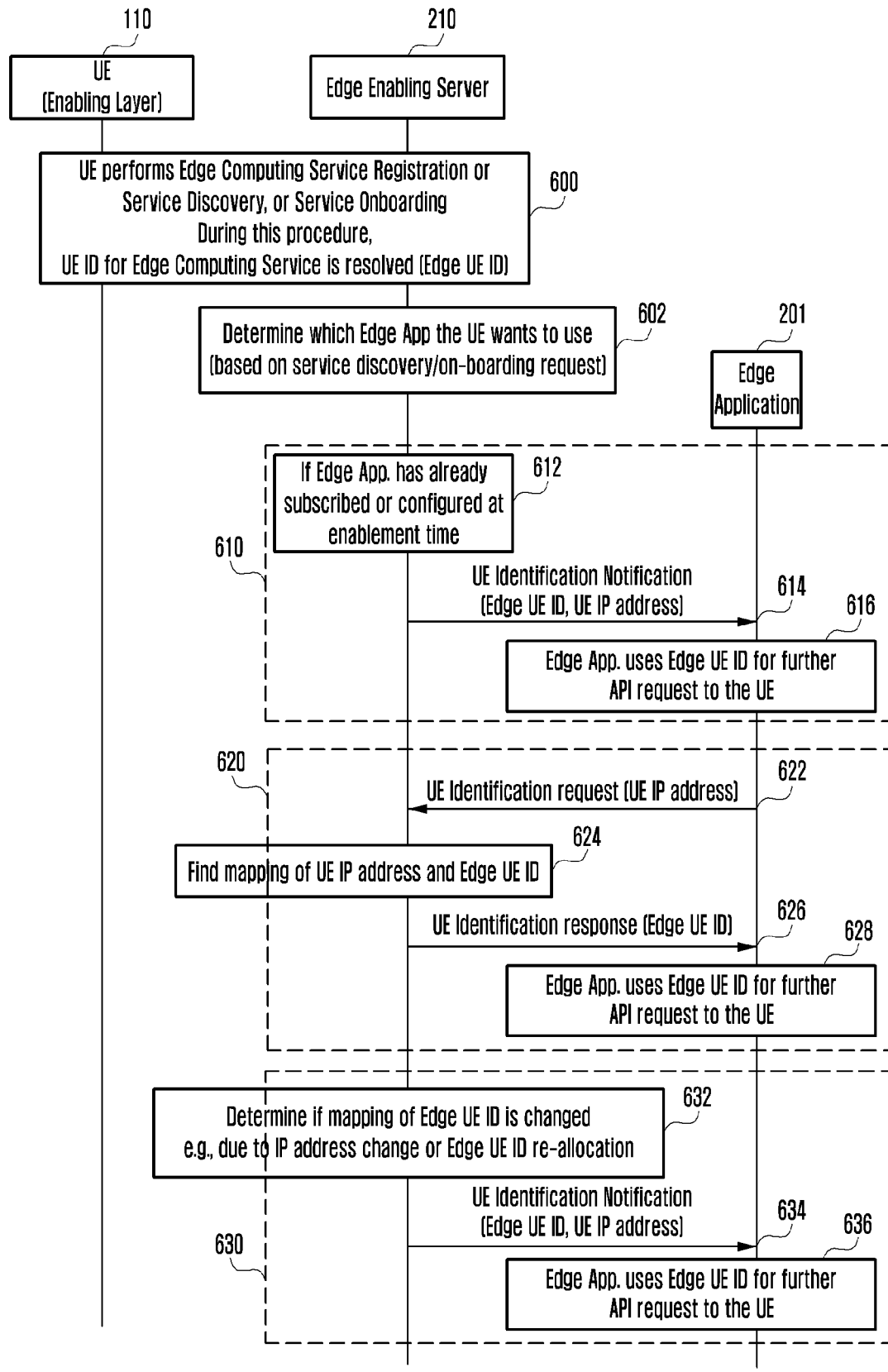
FIG. 6 is a signal flowchart illustrating a process of providing an edge computing service by using an identifier of the UE identified in an edge computing platform according to an embodiment of the disclosure.

FIG. 6 is a signal flowchart illustrating a process of providing an edge computing service by using an identifier of the UE identified in an edge computing platform according to an embodiment of the disclosure.

In a brief description of the overall operation of FIG. 6, the ID identified to be used for the UE 110 in the edge computing platform 200 may be provided to the edge application server 201, and the edge application server 201 may use the ID for the capability exposure API.

According to an embodiment of the disclosure, a plurality of User Plane Functions (UPFs) 132 of the 3GPP network may be connected to one edge computing data network (or edge data network). Hereinafter, the edge computing data network may be the edge data networks 161 and 162 illustrated in FIG. 1B. Accordingly, the UPF 132 close to the UE 110 may be selected according to the location of the UE 110 for one edge computing data network. For example, the case of the UE 110 accessing the same edge computing data network to use the MEC service is described with reference to FIG. 1B. Referring to FIG. 1B, the first UE 110 may receive the edge computing service through the UPF 132*a* which is the closest to the first UE. At this time, when the first UE 110 moves to the location of the second UE 120, the serving UPF of the first UE 110 may be changed from the first UPF 132*a* to the second UPF 132*b* even though the first UE 110 is located within the same edge data network 161.

According to an embodiment of the disclosure, the UPF 132 serving the UE 110 may be changed, which may mean that the IP address of the UE 110 may be changed. Accordingly, when the edge enabling server 210 or the edge management server 140 manages the UE 110 on the basis of the IP address of the UE 110, it is required to perform an operation for updating information for newly identifying the UE 110 whenever the UPF 132 serving the UE 110 is changed, that is, whenever the IP address of the UE 110 is changed. For example, among the embodiments of the disclosure, the embodiments of FIGS. 3 and 4 are needed to be performed whenever the IP address of the UE 110 is changed. This is because, if the UE 110 accesses through the changed IP address, the edge enabling server 210 cannot know whether the corresponding UE 110 is the previously accessed UE 110. Further, if the IP address of the UE 110 is used as an identifier of the UE 110 when the edge application server 201 uses the edge service API, the edge enabling server 210 may use the capability exposure service of the 3GPP network 130 by updating binding of the identifier corresponding to the GPSI for the corresponding UE 110 whenever the IP address of the UE 110 is changed.

According to an embodiment of the disclosure, after the ID of the UE 110 is allocated, it is required to inform the edge application server 201 of the ID of the UE 110. According to the disclosure, a method of, when the edge application server 201 uses the edge service API for the corresponding UE 110, using the ID of the UE allocated to the corresponding UE as the identifier of the UE 110 may be provided.

According to an embodiment of the disclosure, when the above described method is used, the operation of updating the GPSI information on the basis of the IP address of the UE 110 proposed in the embodiments of FIGS. 3 and 4 may not be performed whenever the IP address of the UE 110 is changed.

According to an embodiment of the disclosure, in order to use the MEC service, the UE 110 may perform a registration procedure in the edge management server 140 or the edge enabling server 210 to use the edge computing service in operation 600. According to another embodiment of the disclosure, the UE 110 may perform a service discovery procedure with the edge enabling server 210 in order to identify 3rd applications which can be used in the edge computing platform 200 which the UE accesses to use the MEC service in operation 600. According to another embodiment of the disclosure, the UE 110 may perform a service on-boarding procedure in the edge enabling server 210 to transmit information on an application to be used for the MEC service by the UE in operation 600. According to another embodiment of the disclosure, the UE 110 may inform of an application used by the UE through the service discovery procedure with the edge management server 140 or the edge enabling server 210. The UE 110 may acquire information on the application to be used (for example, the FQDN of the application server, the IP address of the application server, the DNS server address for discovering the corresponding application server, and the like) from the edge management server 140 or the edge enabling server 210 as the result thereof.

As described above, when transmitting the message of operation 600 to the edge management server 140 or the edge enabling server 210, the UE 110 may use the GPSI information which the UE has. As described above, the use of the GPSI information which the UE 110 has may be performed by the control of the edge enabling layer 113 of the UE 110.

According to an embodiment of the disclosure, the edge management server 140 or the edge enabling server 210 may allocate the edge UE ID which the UE 110 should use through at least one of the above-described procedures. According to an embodiment of the disclosure, the embodiment of FIG. 5 may be used. According to another embodiment of the disclosure, the edge management server 140 or the edge enabling server 210 may allocate the GPSI information transmitted in operation 600 to the edge UE ID of the UE 110.

According to an embodiment of the disclosure, the edge management server 140 or the edge enabling server 210 may identify the GPSI of the UE 110 with the 3GPP network 130 or store the GPSI of the UE 110 in the 3GPP network 130 according to the embodiments of FIGS. 3, 4, and 5. Alternatively, after acquiring the GPSI for the corresponding UE 110 through the method according to the embodiment of FIG. 4 on the basis of the IP address transmitted by the UE 110 in operation 600, the edge management server 140 or the edge enabling server 210 may use the GPSI as the edge UE ID of the UE 110.

According to an embodiment of the disclosure, the edge management server 140 or the edge enabling server 210 may transmit a response message to the UE 110 transmitting the request message of operation 600, allocate an edge UE ID which the UE 110 should use to the response message, and transmit the response message. According to an embodiment of the disclosure, the edge management server 140 or the edge enabling server 210 may store the edge UE ID, which is included in the response message and should be used by the UE 110, in the memory.

According to an embodiment of the disclosure, the edge UE ID may be a GPSI transmitted by the UE 110 using the request message in operation 600, a GPSI identified by the 3GPP network 130, or a value allocated by the edge management server 140 or the edge enabling server 210. The edge management server 140 may transmit the ID of the UE 110 allocated by the edge management server to the edge enabling servers 210.

According to an embodiment of the disclosure, when allocating the edge UE ID, the edge management server 140 or the edge enabling server 210 may consider the following matters.

First, the edge management server 140 or the edge enabling server 210 may allocate the edge UE ID for identifying the UE 110 for each 3rd application reported to be used by the UE 110. For example, identifiers of the UE 110 to be used by a first edge application (edge application 1) 201 and a second edge application (edge application 2) 202 are allocated independently for edge application 1 and edge application 2, and thus different values may be allocated. In a specific case, even though the same value is allocated to edge application 1 and edge application 2, edge application 1 and edge application 2 cannot recognize that the identifiers of the UE 110 are the same as each other. As a result, it is possible to prevent each edge application from being aware of the identifier of the UE used by the other edge application. In order to allocate different identifiers of the UE to the respective edge applications, the edge management server 140 or the edge enabling server 210 may use a randomly generated value, which may be mapped to the ID of the edge application and stored. The value may be used by the edge management server 140 or the edge enabling server 210 when the edge application makes a request for the identifier of the UE 110 required for using the edge service API. For example, when the edge application makes a request for the identifier of the UE 110 required for using the edge service API, the edge management server 140 or the edge enabling server 210 may use the value when transmitting the identifier value of the UE 110 allocated for the corresponding edge application as a response.

Second, the edge management server 140 or the edge enabling server 210 may allocate the edge UE ID for identifying the UE for a value to be used between the UE 110 and the edge management server 140 or between the UE 110 and the edge enabling server 210. In other words, the edge management server 140 or the edge enabling server 210 may allocate the edge UE ID for identifying the UE 110 and transmit the same through a response message. However, the allocated edge UE ID may not be used for the API between the edge management server 140 and the edge application or the API between the edge enabling server 210 and the edge application. When allocating the identifier of the UE 110 which should be used by the edge application for the edge service API, the edge enabling server 210 may allocate different identifiers for respective edge applications and transmit the identifiers to the edge applications on the basis of the allocated edge UE ID. That is, the identifier used between the UE 110 and the edge management server 140 or the UE 110 and the edge enabling server 210 and the identifier used between the edge enabling server 210 and the edge application may be separately allocated and managed. This is to protect privacy of the identifier of the UE 110.

According to an embodiment of the disclosure, in operation 502, the edge enabling server 210 may identify the edge application server 201 which the UE 110 desires to use on the basis of the service discovery or service on-boarding request performed by the UE 110.

According to an embodiment of the disclosure, operation 610, operation 620, or operation 630 may be independently performed, and only operation 610 may be performed, only operation 620 may be performed, or only operation 630 may be performed as necessary. According to another embodiment of the disclosure, operation 610, operation 620, or operation 630 may be sequentially or selectively performed.

First, operation 610 is described.

According to an embodiment of the disclosure, the edge enabling server 210 may identify whether there is the edge application server 201 making a request for a subscribe operation to know the ID of the UE 110 in operation 612.

According to another embodiment of the disclosure, if the edge application server 201 has instantiated in the edge computing platform 200 and starts operating in operation 612, the edge enabling server 210 may perform a registration procedure therein (enablement). At this time, the edge enabling server 210 may also make a configuration indicating reception of a notification for the ID of the UE 110.

According to an embodiment of the disclosure, when it is determined that there is the edge application server 201 making a request for the subscribe operation of informing of the ID of the UE 110 or there is information set to inform the edge application server 201 of the ID of the UE 110, the edge enabling server 210 may transmit a message for informing the corresponding edge application server(s) 201 of the ID of the UE 110. This may be operated on the basis of an API.

According to an embodiment of the disclosure, the edge enabling server 210 determining to inform the edge application server 201 of the ID of the UE 110 may transmit an API-based message for informing the corresponding edge application server 201 of the ID of the UE 110 in operation 614. In an embodiment of the disclosure, the message is referred to as a UE identification notification message. However, when the message is a message used to inform the edge application server 201 of the ID of the UE by the edge enabling server 201, the message may be identically understood even though a name different form the name described in the disclosure is used. The edge enabling server 210 may include the ID of the UE 110, that is, the edge UE ID according to an embodiment of the disclosure in the UE identification notification message. According to an embodiment of the disclosure, the edge enabling server 210 may include the IP address of the UE 110 in order to indicate an IP address of the UE 110 using the corresponding edge UE ID. The IP address may be the IP address acquired from the UE 110 in operation 600.

According to an embodiment of the disclosure, the edge application server 201 receiving the UE identification notification message may bind and store an edge UE ID which should be used for the IP of the corresponding UE 110 in operation 616. Although the IP address of the UE 110 is changed and the UE accesses the edge application server therethrough in the future, the edge application server 201 may identify the UE 110 using a corresponding TCP session or application session on the basis of the edge UE ID, and accordingly may newly bind the changed IP address of the UE 110 with the edge UE ID of the UE 110 and store the information. According to an embodiment of the disclosure, the edge application server 201 may use the edge UE ID for the edge service API operation with the edge enabling server 210. According to an embodiment of the disclosure, the edge enabling server 210 may identify the UE 110 on the basis of the edge UE ID included in the edge service API message.

Subsequently, operation 620 is described.

According to an embodiment of the disclosure, when using the edge service API, the edge application server 201 may transmit a UE identifier request message making a request for the identifier of the UE 110 for identifying the UE 110 to the edge enabling server 210 in operation 622. According to an embodiment of the disclosure, the edge application server 201 may use the edge service API through the IP address of the UE 110. However, when the IP address of the UE 110 is changed, if the edge enabling server 210 does not know the changed IP address of the UE 110, the edge enabling server 210 receives the edge service API requested using the IP address of the UE 110 and then cannot identify which UE 110 made the request. Accordingly, the edge application server 201 is required to acquire the identifier of the UE 110 to be used regardless of the IP address of the UE 110. To this end, according to an embodiment of the disclosure, the edge application server 201 may transmit information for identifying the UE 110, that is, an API message for acquiring the ID of the UE 110 to the edge enabling server 210.

According to an embodiment of the disclosure, the edge application server 201 may include the IP address of the UE 110 accessing the edge application server in the UE identifier request message. The identifier for identifying the UE 110 initially is only the IP address of the UE 110. After accessing the edge enabling server 210 to acquire information on the edge application server 201, the UE 110 may access the edge application server 201 to perform data communication, and when the edge application server 201 starts data communication with the corresponding UE 110, perform operation 622 to acquire the ID of the UE 110 for the IP address of the corresponding UE 110.

According to an embodiment of the disclosure, the edge enabling server 210 receiving the UE identifier request message in operation 622 may identify the UE for the IP address of the UE 110 included in the message in operation 624. This may be based on the information acquired as the result in operation 600. When the UE for the IP address of the UE 110 included in the UE identifier request message of operation 622 cannot be found, the edge enabling server 210 may determine that the corresponding UE 110 is not the UE 110 accessing the edge computing platform 200. In this case, the edge enabling server 210 may transmit failure information indicating that the ID of the corresponding UE 110 cannot be informed to the edge application server 201.

According to an embodiment of the disclosure, after accessing the edge enabling server 210, the UE 110 may receive information on the edge application server 201 and start data communication with the corresponding edge application server 201. In this case, possibility of the change in the IP address due to the change in the location of the UE 110 is significantly low. Accordingly, when the edge enabling server 210 cannot identify the UE 110 through the IP address of the UE 110 received from the edge application server 201, it is highly likely that the UE is the UE 110 which has not accessed the corresponding edge computing platform 200. Accordingly, the edge UE ID cannot be allocated to the corresponding UE 110.

According to another embodiment of the disclosure, even though the edge enabling server 210 cannot identify the IP address of the UE 110 received in operation 622, the edge enabling server 210 may temporarily store the corresponding IP address with the edge application server 201 making a request for the corresponding IP address. When the UE 110 performs a new procedure in the edge enabling server 210 due to the change in the IP address in the future, the edge enabling server 210 may compare the IP address of the UE 110 received in the new procedure with the temporarily stored IP address according to the operation. Accordingly, when the two IP addresses are the same as each other, the edge application server 210 may bind and store the edge UE ID for the UE 110 having the IP address. According to an embodiment of the disclosure, since the edge enabling server 210 also stores information on the edge application server 201 having made the request for the stored temporary IP address, the edge enabling server may determine to transmit the newly bound edge UE ID to the corresponding edge application server 201. Accordingly, the edge enabling server 210 may inform the edge application server 201 of the ID of the UE 110 in operation 626 or operation 614.

According to an embodiment of the disclosure, after searching for the edge UE ID for the IP address of the UE 110 included in the message of operation 622, the edge enabling server 210 may insert the information into a response message in operation 626 and transmit the response message to the edge application server 201 in operation 626. The edge application server 201 receiving the response message may use the received edge UE ID information as the identifier of the UE 110 when making a request for an edge service API for the UE 110 in the future. Accordingly, even though the IP address of the UE 110 accessing the edge application server 201 is changed, the edge application server 201 may call the edge service API by using the edge UE ID, and the edge enabling server 210 may perform an edge service API operation on the basis of the received edge UE ID.

In another example, after searching for the identifier of the UE for the IP address of the UE 110 included in the message of operation 622, the edge enabling server 210 may allocate the identifier of the UE to be transmitted to the edge application server 201 in operation 626. This case may correspond to a state in which the edge UE ID for identifying the UE, that is, the edge UD ID allocated to the UE in operation 600 has been allocated and there is no identifier of the UE to be used between the edge application server 201 and the edge enabling server 210. That is, as described above, the UE identifier used between the UE 110 and the edge enabling server 210 and the identifier used between the edge enabling server 210 and the edge application server 201 are different. For example, the UE identifier used between the UE 110 and the edge enabling server 210 is configured as "AAA" and the identifier used between the edge enabling server 210 and the second edge application server 202 is not configured. In this case, the edge enabling server 210 may configure the identifier to be used between the edge enabling server 210 and the second edge application server 202 as "ABC".

In another example, the case may correspond to the case in which the UE identifier used between the UE 110 and the edge enabling server 210 is configured as "AAA" and the identifier to be used between the edge enabling server 210 and the second edge application server 202 is configured as "ABC", but the identifier to be used with the first edge application server 201 is not configured. In this case, the edge enabling server 210 may configure the identifier to be used between the edge enabling server 210 and the first edge application server 201 as "CDAB". "AAA", "ABC", "CDAB", and the like may be used to indicate specific identifier values, but values according to each system or standard may be configured in the real system. At this time, the edge enabling server 210 may separately allocate the edge UE ID for identifying the UE 110 for each 3rd application. For example, by allocating different identifiers of the UE to be used for edge application 1 and edge application 2, it is possible to prevent each edge application from becoming aware of the identifier of the UE used by the other edge application. In order to allocate different identifiers of the UE 110 to the respective edge applications, the edge enabling server 210 may use a randomly generated value, which may be mapped to the ID of the edge application and stored. Further, the edge enabling server 210 may bind the edge UE ID allocated for each edge application to the identifier of the corresponding UE 110 (For example, the GPSI or the identifier mutually identified between the edge enabling server 210 and the UE) and store the bound information. Accordingly, the edge enabling server 210 may identify which UE is indicated by the corresponding ID for the edge UE ID allocated to the edge application on the basis of the bound information. In other words, the edge management server 140 or the edge enabling server 210 may internally store the edge UE ID for identifying the UE 110 but may not use the edge UE ID in the API with the edge application. When allocating the identifier of the UE which should be used by the edge application for the edge service API, the edge enabling server 210 may allocate different identifiers for respective edge applications and transmit the identifiers to the edge applications on the basis of the allocated edge UE ID. That is, the identifier used between the UE 110 and the edge management server 140 or the edge enabling server 210 and the identifier used between the edge enabling server 210 and the edge application may be separately allocated and managed. This is to protect privacy of the identifier of the UE 110. In the disclosure, the UE identifier used between the edge application and the edge enabling server 210 is also referred to as the edge UE ID, but the value may be a different value between the UE 110 and the edge enabling server 210 and between the edge enabling server 210 and the edge application 201. The mapping or binding information may be stored in the edge enabling server 210. After performing the allocation procedure, the edge enabling server 210 may insert the identifier (edge UE ID in the figure) of the UE allocated for each edge application into the response message and transmit the response message to the edge application server 201. The edge application server 201 receiving the response message may use the received edge UE ID information as the identifier of the UE 110 when making a request for an edge service API for the UE 110 in the future.

Last, operation 630 is described.

According to an embodiment of the disclosure, the edge enabling server 210 may determine whether mapping of the edge UE ID and the IP address information of the UE 110 is changed in operation 632. According to another embodiment of the disclosure, the edge enabling server 210 may change the edge UE ID for the UE 110 in which case it may be determined that mapping of the edge UE ID and the IP address information is changed. When the IP address is changed, the edge enabling server 210 may identify the change through a new procedure. For example, when the edge enabling server 210 performs a registration procedure, a service discovery procedure, or a service on-boarding procedure with the UE 110, the UE 110 may include the edge UE ID (which may be the same as the GPSI value) allocated or used by the UE in the message transmitted to the edge enabling server 210 to perform the procedure. Accordingly, the edge enabling server 210 may identify whether the IP address of the UE 110 is changed on the basis of the IP address of the UE 110 transmitting the corresponding message and the edge UE ID included in the UE 110.

According to an embodiment of the disclosure, when the IP address of the UE 110 is changed, the edge enabling server 210 may bind the changed IP address of the UE 110 to the edge UE ID and store the information in the memory 214. According to another embodiment of the disclosure, the edge enabling server 210 may allocate a new edge UE ID to the UE 110 and store the newly allocated edge UE ID in the memory 214. This may occur due to a security issue, for example, exposure of the ID to the outside, or allocation of a new ID because of failure of an authentication of the UE 110.

According to another embodiment of the disclosure, due to the change in the IP address of the UE 110, the edge enabling server 210 may allocate a new edge UE ID for the changed IP address. The edge enabling server 210 may allocate the new edge UE ID, bind the edge UE ID to the IP address of the UE 110, and store the bound information in the memory 214.

According to an embodiment of the disclosure, when binding information of the edge UE ID and the IP address of the UE 110 is updated, the edge enabling server 210 may inform the edge application server 201 of the update in operation 634. A UE identifier notification message to be transmitted to the edge application server 201 may include the edge UE ID or the IP address of the UE 110. The edge application server 201 receiving the UE identifier notification message may determine to use the edge UE ID received for the IP address of the UE 110 included in the message and store the same. Accordingly, when the UE 110 accesses the edge application server 201 to perform data communication, if the data communication is performed using the IP address of the UE 110 included in the message, the edge application server 201 may determine the edge UE ID for the corresponding IP address and call an edge service API through the edge UE ID in operation 636.

According to an embodiment of the disclosure, the edge enabling server 210 may change the identifier of the UE 110 allocated to the edge application server 201 in operation 632. For example, the edge enabling server 210 may update the identifier of the UE 110 allocated for each edge application to a new value. The allocation of the new value may be performed to maintain security of the identifier of the corresponding UE or, when the identifier for identifying the UE 110 is changed or the IP address of the UE 110 is changed, to provide a new identifier of the UE corresponding thereto to the edge application server 201. When information on the identifier of the UE which the edge application server 201 should use is updated, the edge enabling server 210 may inform the edge application server 201 of the update. The UE identifier notification message to be transmitted to the edge application server 201 may include the updated edge UE ID of the UE 110, the IP address of the UE 110, or user information which can be identified by the edge application server 201 (for example, an identifier of a user using the edge application, a user ID, user information for identifying the corresponding user, for example, an email address of the user, an ID of the user, or a reference value allocated to the application client of the UE by the application server). The edge application server 201 receiving the UE identifier notification message may know which UE is identified on the basis of the user information included in the message, determine to use the updated edge UE ID included in the message for the UE, and store the edge UE ID. Thereafter, the edge application server 201 may call the edge service API provided by the edge enabling server 210 on the basis of the updated edge UE ID.

When the identifier of the UE allocated for each edge application is updated, the edge enabling server 210 may update a new identifier for each of all edge applications or update a new identifier for only some edge applications. The edge enabling server 210 may transmit an identifier update message of the UE 110 to the corresponding edge application server 201 for the edge application of which the identifier is updated in operation 634.

According to an embodiment of the disclosure, when the edge enabling server 210 recognizes the edge application which the UE does not use anymore, the edge enabling server may inform the edge application server 201 corresponding to the corresponding edge application that the edge service API cannot be used anymore. After receiving a request such as application discovery or the like requested by the UE 110 (or the edge enabling layer 113), the edge enabling server 210 may know the edge application which the corresponding UE 110 desires to use and the edge application which the UE 110 does not use anymore. An application which the UE 110 (or the edge enabling layer 113 of the UE 110) included in the previous request but does not include in the application discovery request message which the UE (or the edge enabling layer 113 of the UE 110) transmits to the edge enabling server 210 may be identified, and it may be determined that the corresponding application is not used by the UE 110 anymore. Alternatively, the UE 110 (or the edge enabling layer 113 of the UE 110) may designate an application which the UE does not use anymore in the application discovery request message and transmit the application discovery request message to the edge enabling server 210. The edge enabling server 210 receiving the application discovery request message may determine that the corresponding UE 110 does not use the edge application anymore. After determining the application determined not to be used by the UE 110, the edge enabling server 210 may transmit a message to the edge application server 201 executing the corresponding edge application to prevent the use of the edge service API used for the corresponding UE 110. The edge enabling server 210 receiving the message may include the identifier of the UE 110 previously transmitted to the edge application server 201 and an indicator indicating that the use of the edge service API for the corresponding UE 110 is not possible anymore. The edge application server 201 receiving the message may identify the identifier of the UE included in the message and identify the indicator indicating that the use of the edge service API for the corresponding UE 110 is not possible anymore in the message. Accordingly, the edge application server 201 may determine that the use of the edge service API for the corresponding UE 110 is not possible and may not make a request for the edge service API for the corresponding UE to the edge enabling server 210 anymore.

In another method, the edge enabling server 210 may insert the identifier of the UE previously transmitted to the edge application server 201 into the message and include an indicator indicating that the identifier of the corresponding UE 110 is not valid anymore. The edge application server 201 receiving the message may identify the identifier of the UE included in the message, and identify the indicator indicating that the identifier of the corresponding UE is not valid anymore in the message. Accordingly, the edge application server 201 may determine that the use of the edge service API for the corresponding UE 110 is not possible and may not make a request for the edge service API for the corresponding UE to the edge enabling server 210 anymore.

Figure 7A:
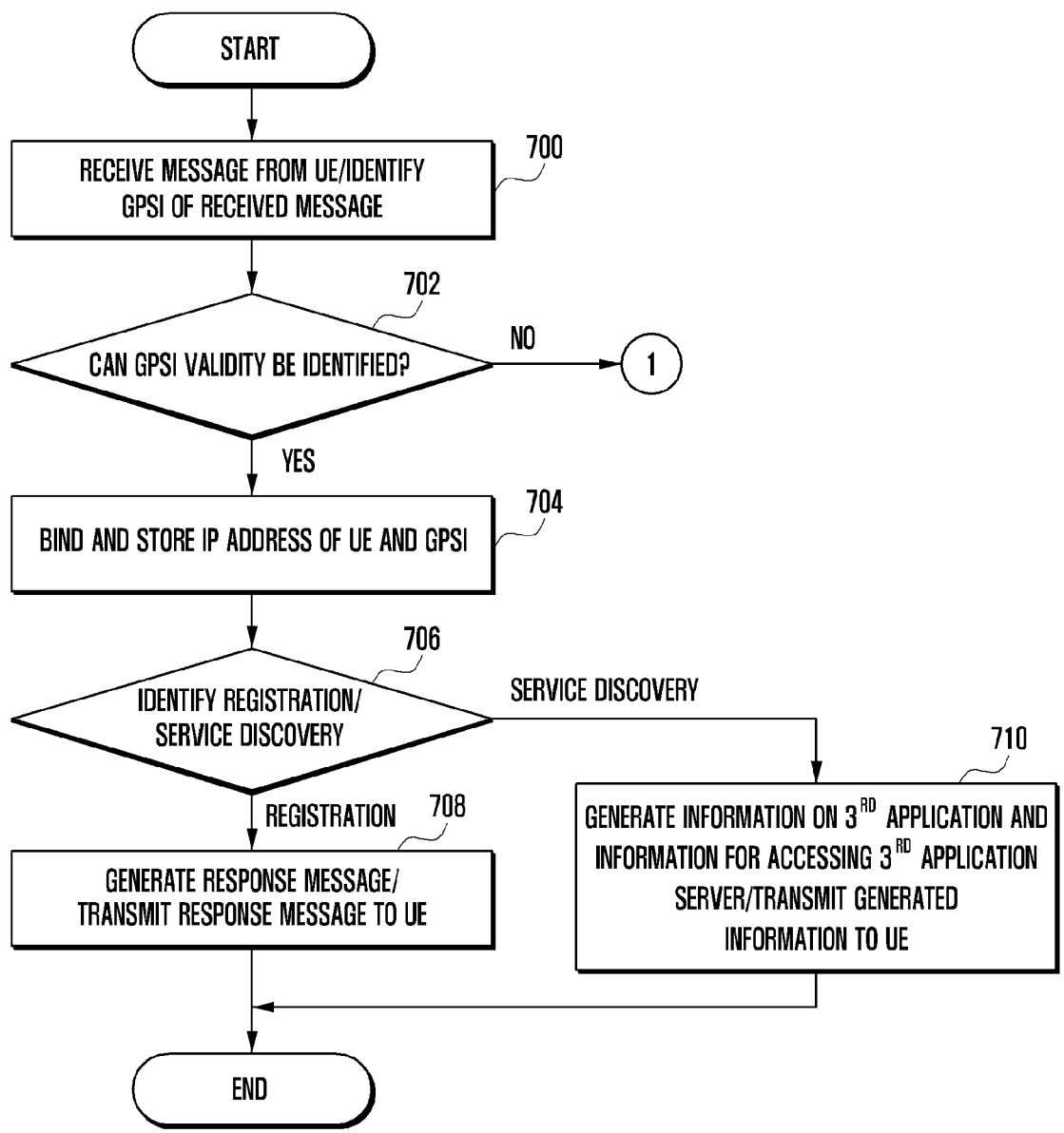
FIGS. 7A and 7B are control flowcharts illustrating a process in which the edge enabling server manages the identifier of the UE capable of receiving the MEC service according to an embodiment of the disclosure.
Figure 7B:
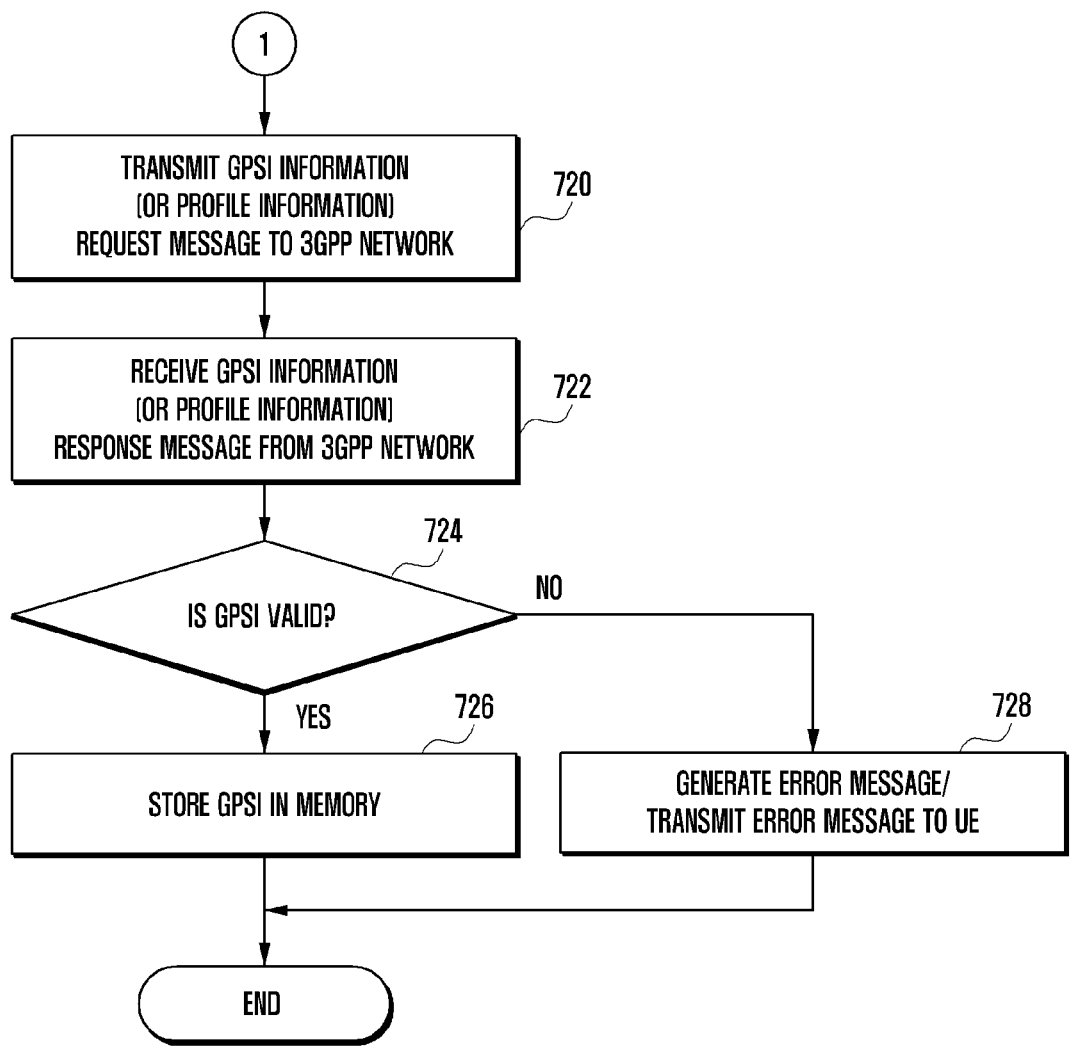

FIGS. 7A and 7B are control flowcharts illustrating a process in which the edge enabling server manages the identifier of the UE capable of receiving the MEC service according to an embodiment of the disclosure.

According to an embodiment of the disclosure, the edge enabling server 210 may receive an edge service registration message or an edge service discovery message from the UE 110. At this time, the edge service registration message or the edge service discovery message may include the GPSI of the UE 110. Accordingly, the edge enabling server 210 may check whether validity can be identified on the basis of the GPSI included in the message in operation 702. For example, the edge enabling server 210 may receive a user profile of the UE 110 in advance. The user profile may be received when the authentication/authorization operation of the UE 110 is performed in advance. Accordingly, the edge enabling server 210 may determine whether validity of the GPSI can be identified by checking whether profile information corresponding to the GPSI received in operation 700 is pre-stored. When there is pre-stored profile information, the edge enabling server 210 may perform operation 704 and, when there is no pre-stored profile information, perform operation 720.

According to an embodiment of the disclosure, it may be determined that the validity check of the GPSI is performed even when the profile of the UE 110 is not received but only the GPSI of the corresponding UE is received in the authentication/authorization operation. According to an embodiment of the disclosure, when the GPSI received in operation 700 is the same as the pre-stored GPSI, it may be identified that the GPSI is valid in the validity check.

According to an embodiment of the disclosure, the edge enabling server 210 may bind the valid GPSI to the IP of the UE received in operation 700 and store the bound information in the memory 214 in operation 704.

According to an embodiment of the disclosure, the edge enabling server 210 may identify whether the message received in operation 700 is a registration message or a service discovery message in operation 706. When the message received in operation 700 is a registration message, the edge enabling server 210 may generate a response message to be transmitted to the UE 110 and transmit the response message to the UE in operation 708. On the other hand, when the message received in operation 700 is a service discovery message, the edge enabling server 210 may generate information on a 3rd application which can be used through the edge computing service and information for accessing to a 3rd application server (for example, FQDN or IP address) as a response message and transmit the response message to the UE in operation 712.

According to another embodiment of the disclosure, the edge enabling server 210 may transmit a message making a request for GPSI information (or profile information) to the 3GPP network 130 in operation 720. The edge enabling server 210 may or may not be reliable in the 3GPP network 130.

According to an embodiment of the disclosure, when the edge enabling server 210 is reliable in the 3GPP network 130, the edge enabling server may directly transmit a request message to an entity for managing information in the 3GPP network 130. According to another embodiment of the disclosure, when the edge enabling server 210 is not reliable in the 3GPP network 130, the edge enabling server may make a request for transmitting a message through the NEF 134 of the 3GPP network 130.

According to an embodiment of the disclosure, the edge enabling server 210 may receive the response message directly from a specific entity of the 3GPP network 130 or through the NEF 134 in operation 722. The response message may include GPSI information of the UE or profile information of the UE.

According to an embodiment of the disclosure, the edge enabling server 210 may identify whether the GPSI information of the UE is valid information on the basis of the GPSI information received in operation 700 and the information received while being included in the response message in operation 722.

According to an embodiment of the disclosure, when the GPSI information of the UE is valid on the basis of the identification result of operation 724, the edge enabling server 210 may store the GPSI in the memory 214 in operation 726. On the other hand, when the GPSI information of the UE is not valid on the basis of the identification result of operation 724, the edge enabling server 210 may generate an error message and transmit the error message to the UE in operation 728. The error message transmission may be omitted if unnecessary.

Figure 8:
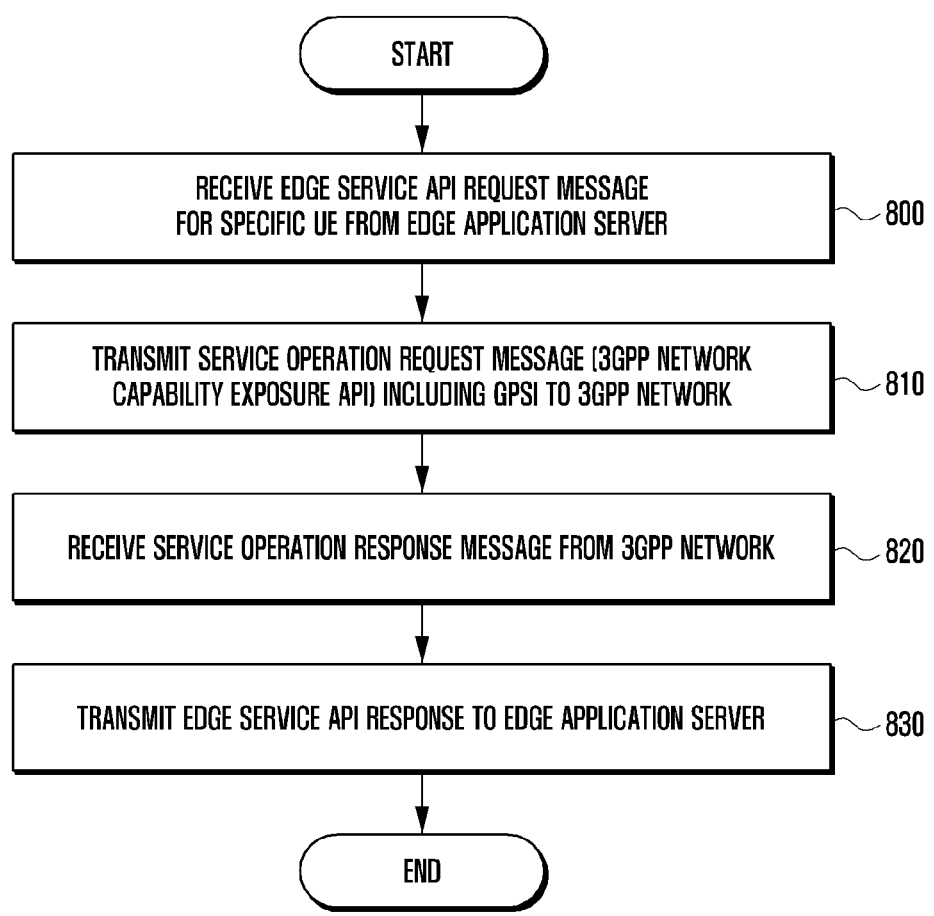
FIG. 8 is a control flowchart illustrating a process in which the edge enabling server provides information on the UE to the edge application server according to an embodiment of the disclosure.

FIG. 8 is a control flowchart illustrating a process in which the edge enabling server provides information on the UE to the edge application server according to an embodiment of the disclosure.

Prior to the description of FIG. 8, the edge enabling server 210 may receive or acquire and store UE identifier information as illustrated in FIG. 7 above, and may acquire the UE identifier information from the 3GPP network 130 if necessary.

According to an embodiment of the disclosure, the edge enabling server 210 may receive an edge service API request message for a specific UE from the edge application server 201 in operation 800. At this time, the edge service API request message may include IP information of the UE. Accordingly, the edge enabling server 210 may acquire GPSI information on the basis of the pre-acquired IP address of the UE.

According to an embodiment of the disclosure, the edge enabling server 210 may transmit a service operation request message (3GPP network capability exposure API) including the GPSI to the 3GPP network.

According to an embodiment of the disclosure, when the edge enabling server 210 is reliable in the 3GPP network 130, the edge enabling server may directly transmit a request message to an entity for managing information in the 3GPP network 130. According to another embodiment of the disclosure, when the edge enabling server 210 is not reliable in the 3GPP network 130, the edge enabling server may make a request for transmitting a message through the NEF 134 of the 3GPP network 130.

According to an embodiment of the disclosure, the edge enabling server 210 may receive the service operation response message through the NEF 134 of the 3GPP network 130 or directly from an entity having the corresponding information in operation 820. As described above, when receiving the service operation response message from the GPP network 130, the edge enabling server 210 may generate an edge service API response message and transmit the same to the edge application server 201 in operation 830.

Figure 9A:
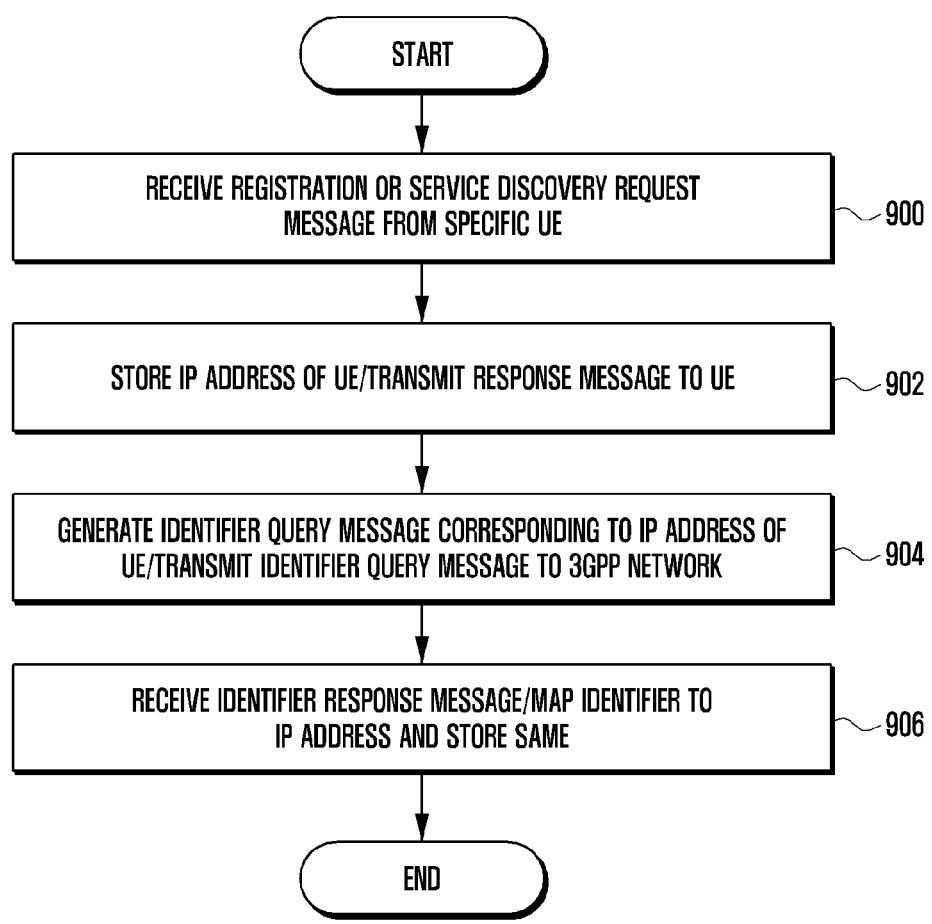
FIG. 9A is a control flowchart illustrating a process in which the edge management server allocates an identifier to the UE according to an embodiment of the disclosure.

FIG. 9A is a control flowchart illustrating a process in which the edge management server allocates an identifier to the UE according to an embodiment of the disclosure.

Referring to FIG. 9A, the edge management server 140 may receive a registration request message from a specific UE in operation 500. According to an embodiment of the disclosure, the edge management server 140 may allocate an edge UE ID which can be used in the edge computing platform 200 which the UE 110 currently accesses. According to an embodiment of the disclosure, the edge management server 140 may bind the IP Address of the UE received from the UE in operation 900 to the allocated edge UE ID and store the found information in the memory in operation 902. Further, the edge management server 140 may insert the allocated edge UE ID into a response message and transmit the response message to the corresponding UE in operation 902. Accordingly, the edge UE ID may be allocated to the UE.

According to an embodiment of the disclosure, the edge management server 140 may transmit a message to the edge enabling servers 210 within the edge computing platform 200 in operation 904.

According to an embodiment of the disclosure, the edge management server 140 may perform an operation for configuring the edge UE ID allocated to the UE as an external ID of the 3GPP network 130 or the GPSI in operation 906. According to an embodiment of the disclosure, the edge management server 140 may transmit a request message for inserting the edge UE ID allocated by the edge management server into subscription information of the UE 110 through the NEF 134.

According to another embodiment of the disclosure, for the IP address of the UE 110 acquired in operation 900, the edge management server 140 may transmit information indicating the use of the edge UE ID allocated by the edge management server 140 as the GPSI using the corresponding IP address to the PCF 135.

According to another embodiment of the disclosure, the edge management server 140 may make a request for registering the edge UE ID allocated to the UE as the GPSI of the UE to a subscriber server or a policy server of the 3GPP network 130 in operation 906. Accordingly, the 3GPP network 130 may recognize a value corresponding to the edge UD IE as the GPSI and thus may identify the UE on the basis of the GPSI.

Figure 9B:
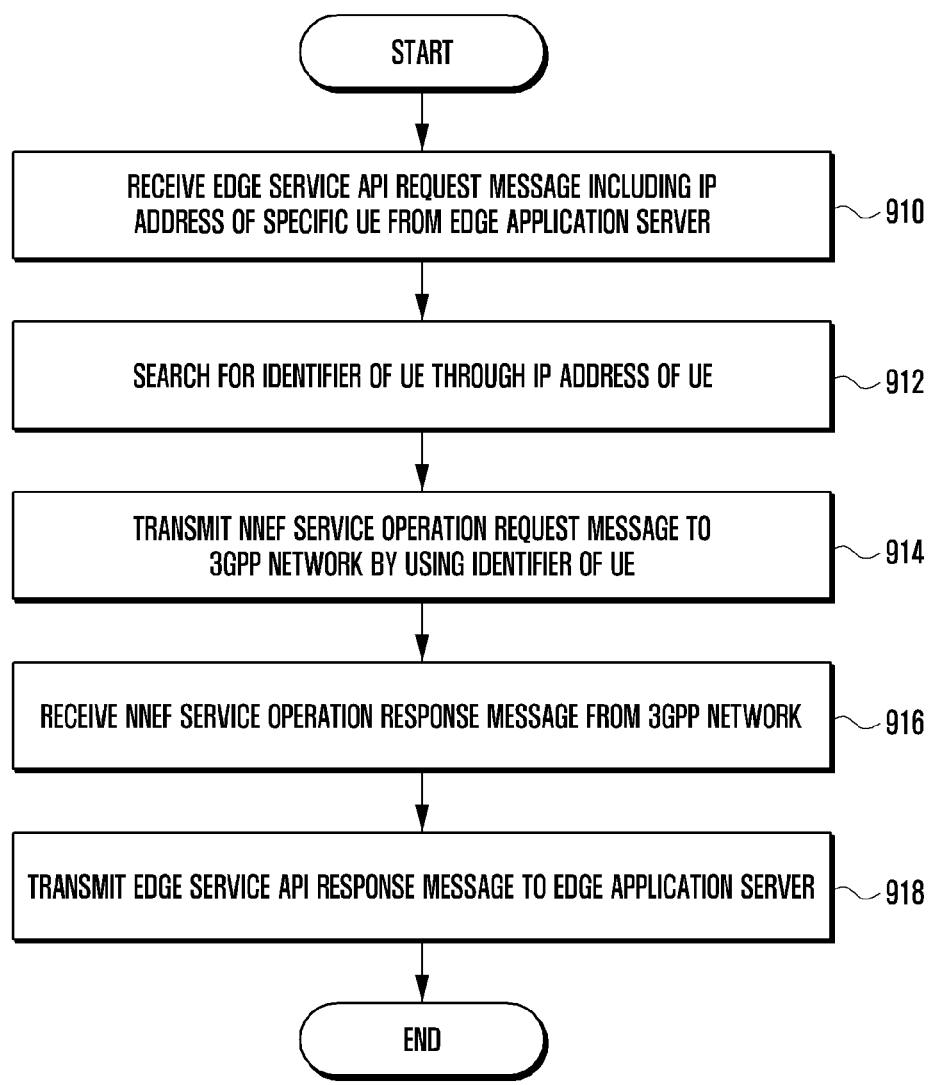
FIG. 9B is a control flowchart illustrating a process in which the edge enabling server provides an edge service API from an edge application according to an embodiment of the disclosure.

FIG. 9B is a control flowchart illustrating a process in which the edge enabling server provides an edge service API from an edge application according to an embodiment of the disclosure.

According to an embodiment of the disclosure, the edge enabling server 210 may receive an edge service API request message from the edge application server 201 in operation 910. In the specification of the disclosure, the edge service API request message may be an API that provides a capability exposure function for an edge computing service to a 3rd application server operating in infrastructure of the edge data network to which the edge enabling server 210 belongs. For example, there may be a location API for detecting the location of the UE 110, a management API for managing resources of the UE 110, and a traffic steering API for modifying a data path of the UE 110.

According to an embodiment of the disclosure, the edge enabling server 210 may search for and acquire the identifier of the UE, that is, the GPSI by using the IP of the UE in operation 912. The GPSI may be information received from the application management server 140 and pre-stored in FIG. 9A above.

According to an embodiment of the disclosure, in operation 914, the edge enabling server 210 may transmit a service operation request (Nnef service operation request) message to a specific entity of the 3GPP network 130 by using the mapped edge UE ID information as the ID of the UE 110 in the GPSI form. At this time, the GPSI may be inserted into the request message as the ID of the UE and transmitted.

According to another embodiment of the disclosure, when transmitting the service operation request (Nnef service operation request) message to the 3GPP network 130 in operation 914, the edge enabling server 210 may or may not be reliable in the 3GPP network 130.

According to an embodiment of the disclosure, when the edge enabling server 210 is reliable in the 3GPP network 130, the edge enabling server may directly transmit a request message to an entity for managing information in the 3GPP network 130. According to another embodiment of the disclosure, when the edge enabling server 210 is not reliable in the 3GPP network 130, the edge enabling server may make a request for transmitting a message through the NEF 134 of the 3GPP network 130.

According to an embodiment of the disclosure, the edge enabling server 210 may receive an Nnef service operation response message from the 3GPP network 130 in operation 916.

According to an embodiment of the disclosure, the edge enabling server 210 may generate an edge service API response message on the basis of the message received in operation 916 and transmit the edge service API response message to the edge application server 201 in operation 918.

Figure 10A:
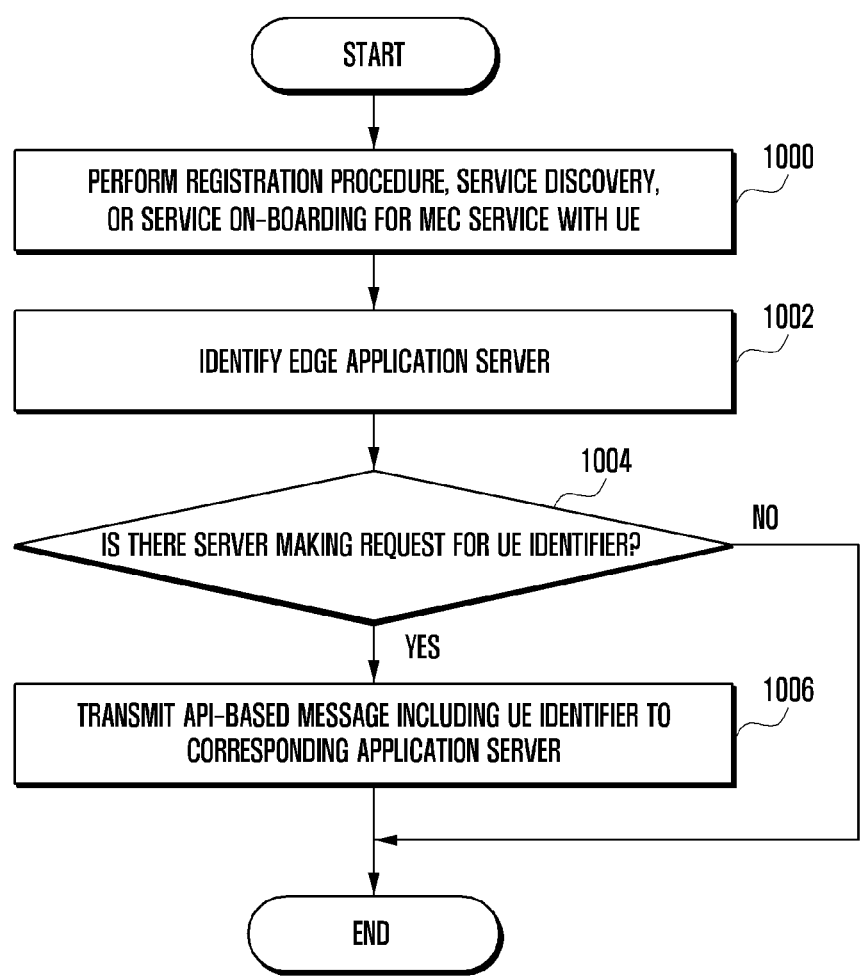
FIGS. 10A to 10C are control flowcharts illustrating a process in which the edge enabling server manages an identifier to allow the mobile communication UE to receive the MEC service according to an embodiment of the disclosure.
Figure 10B:
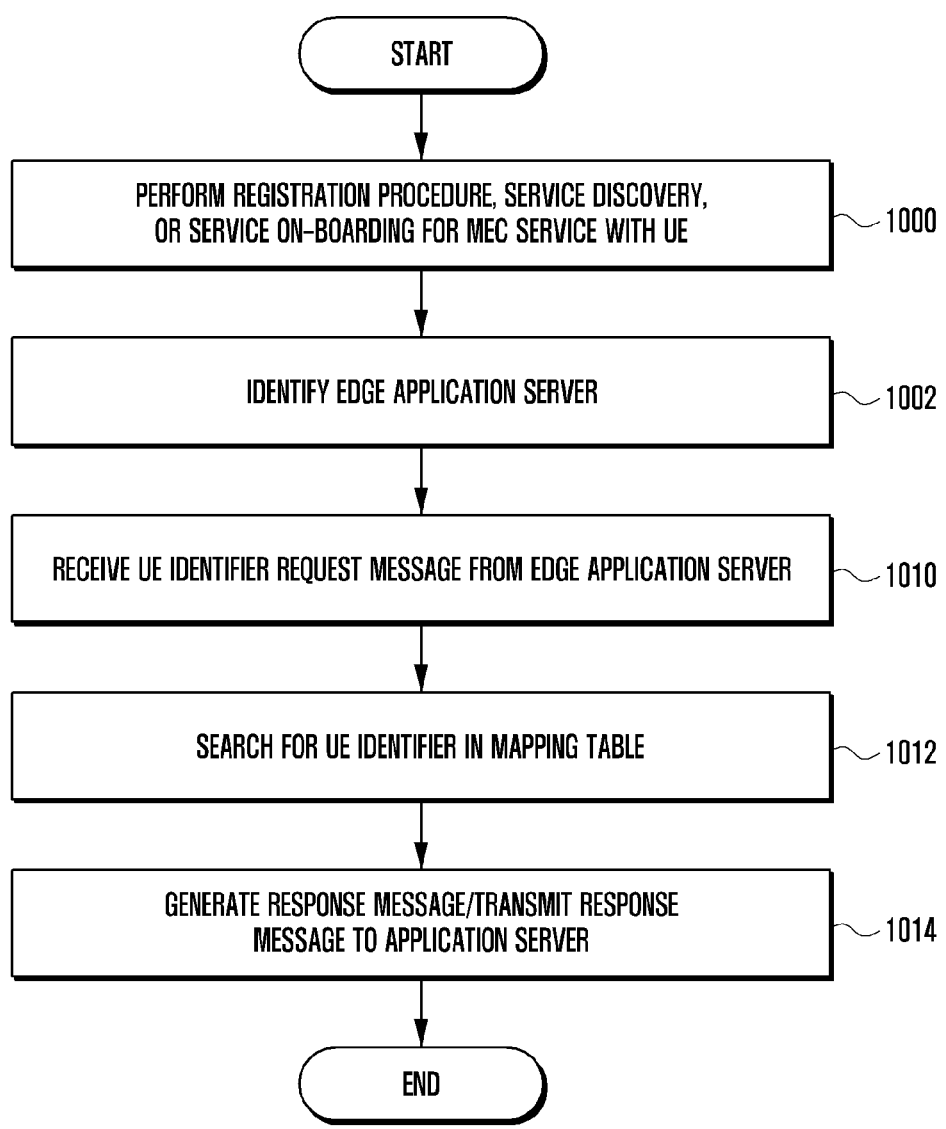
Figure 10C:
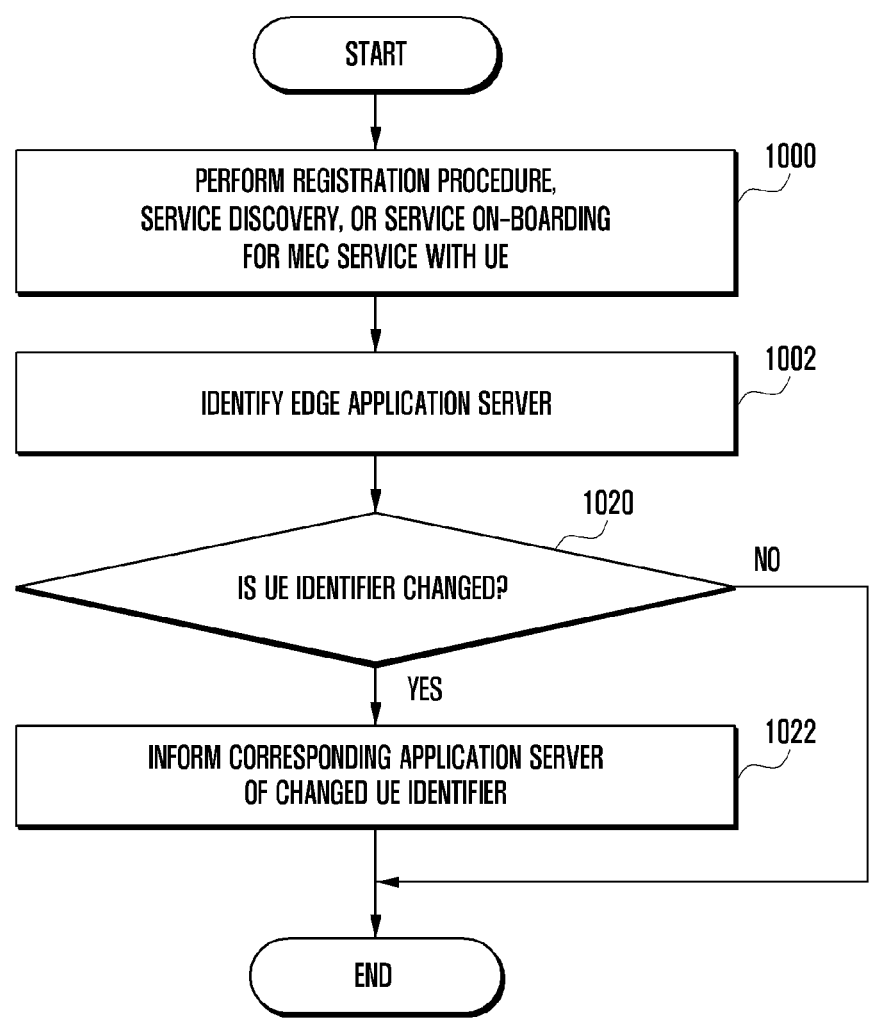

FIGS. 10A to 10C are control flowcharts illustrating a process in which the edge enabling server manages an identifier to allow the mobile communication UE to receive the MEC service according to an embodiment of the disclosure.

Referring to FIG. 10A, the edge enabling server 210 may perform a registration procedure to use an edge computing service from the UE, a service discovery procedure to identify 3rd applications which can be used in the edge computing platform 200 which the edge enabling server accesses in order to use the MEC service, or a service on-boarding procedure to transmit information on an application to be used for the MEC service in operation 1000.

According to an embodiment of the disclosure, in this case, the edge enabling server 210 may identify an edge application server which the UE desires to use by using information included in the previously received message in operation 1002.

Thereafter, the edge enabling server 210 may identify whether there is an edge application server making a request for a UE identifier in operation 1004.

According to another embodiment of the disclosure, when the edge application server 201 has instantiated in the edge computing platform 200 and starts operating, the edge enabling server 210 may perform a registration procedure therein (enablement). At this time, the edge enabling server 210 may also make a configuration indicating reception of a notification for the ID of the UE. According to an embodiment of the disclosure, when the edge enabling server 210 determines that there is an edge application server 201 making a request for an subscribe operation for being informed of the ID of the UE or there is information configured to inform the edge application server 201 of the ID of UE, operation 1006 may be performed.

According to an embodiment of the disclosure, the edge enabling server 210 may transmit a message for informing the corresponding edge application server(s) 201 of the ID of the UE 110 in operation 1006. This may be operated on the basis of an API.

According to an embodiment of the disclosure, the edge enabling server 210 determining to inform the edge application server 201 of the ID of the UE may transmit an API-based message for informing of the ID of the UE 110 to the corresponding edge application server 201 in operation 1006. In an embodiment of the disclosure, the message is referred to as a UE identification notification message. However, when the message is a message used to inform the edge application server 201 of the ID of the UE by the edge enabling server 210, the message may be identically understood even though a name different form the name described in the disclosure is used. The edge enabling server 210 may include the ID of the UE, that is, the edge UE ID according to an embodiment of the disclosure in the UE identification notification message. According to an embodiment of the disclosure, the edge enabling server 210 may include the IP address of the UE in order to indicate an IP address of the UE using the corresponding edge UE ID. This may be the IP address acquired from the UE in operation 1000.

Referring to FIG. 10B, operation 1000 and operation 1002 in FIG. 10B may be operations that are the same as the operation described above with reference to FIG. 10A. Accordingly, an additional description is omitted in the embodiment of FIG. 10B.

According to an embodiment of the disclosure, the edge enabling server 210 may receive a UE identifier request message for identifying the UE to use the edge service API from the edge application server 201 in operation 1010. According to an embodiment of the disclosure, the UE identifier request message may use the edge service API using the IP address of the UE.

According to an embodiment of the disclosure, the UE identifier request message may include the IP address of the UE accessing the edge application server 201. The identifier for identifying the UE 110 initially is only the IP address of the UE 110.

According to an embodiment of the disclosure, in operation 1012, the edge enabling server 210 may search for and acquire the edge UE ID corresponding to the IP address of the UE included in the information acquired in operation 1000 and the message received in operation 1010.

According to an embodiment of the disclosure, the edge enabling server 210 may generate a response message including the acquired edge UE ID and transmit the response message to the edge application server 201 in operation 1014.

Referring to FIG. 10C, as described above, operation 1000 and operation 1002 may be operations that are the same as the operation described with reference to FIG. 10A. Accordingly, a description of the same operation is omitted.

The edge enabling server 210 may determine that mapping of the edge UE ID and the IP address information of the UE therefor is changed in operation 1020. According to another embodiment of the disclosure, the edge enabling server 210 may change the edge UE ID for the UE and determine that mapping of the edge UE ID and the IP address information therefor is changed. When the IP address is changed, the edge enabling server 210 may identify the change through a new procedure. For example, when the edge enabling server 210 performs a registration procedure, a service discovery procedure, or a service on-boarding procedure with the UE, the UE may include the edge UE ID (which may be the same as the GPSI value) allocated or used by the UE in the message transmitted to the edge enabling server 210 to perform the procedure. Accordingly, the edge enabling server 210 may identify whether the IP address of the UE is changed on the basis of the IP address of the UE transmitting the corresponding message and the edge UE ID included in the UE.

According to an embodiment of the disclosure, since the UE identifier is changed in operation 1022, the edge enabling server 210 may transmit the changed edge UE ID and/or IP address of the UE to the application server 201 in operation 1022.

Figure 11:
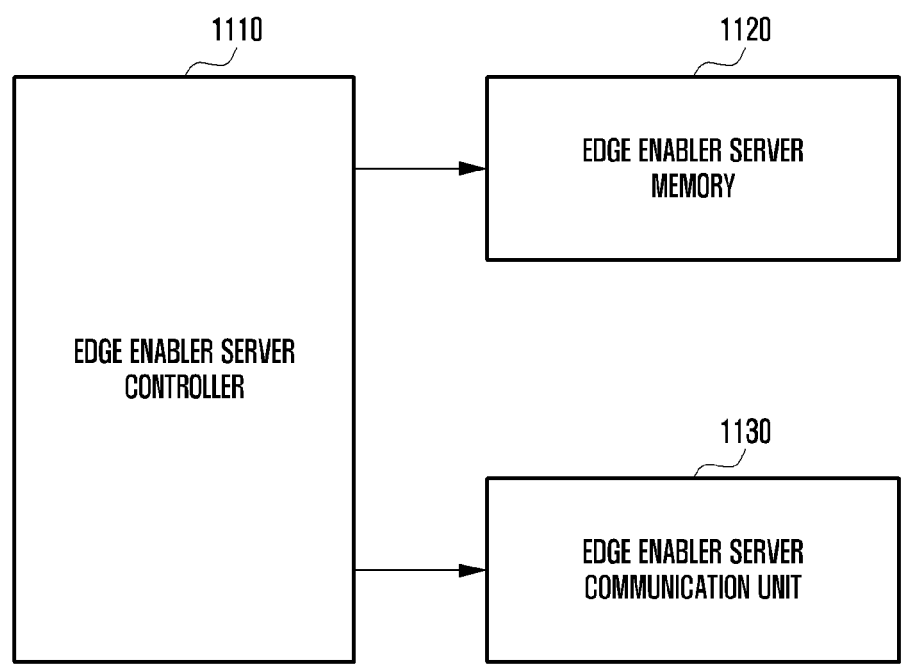
FIG. 11 is a block diagram of the edge enabler server according to an embodiment of the disclosure.

FIG. 11 is an internal diagram of the edge enabler server according to an embodiment of the disclosure.

Referring to FIG. 11, the edge enabler server 120 may include an edge enabler server controller 1110, an edge enabler server memory 1120, and an edge enabler server communication unit 1130 therein. In the case of the edge enabler server 120 illustrated in FIG. 11, the edge application servers operate in a separate server unlike in FIG. 2.

The edge enabler server controller 1110 may be implemented by at least one processor and may perform the above-described control operation. For example, the edge enabler server controller may perform control to allocate an identifier of the UE, authenticate an identifier of the UE through the 3GPP network, or transmit and receive a message to and from the edge application server 201 within the edge platform.

The edge enabler server memory 1120 may store mapping or bound information between control information controlled by the edge enabler server 120 and identifier information of a specific UE.

The edge enabler server communication unit 1130 may transmit and receive signals and/or messages between the edge enabler server 120 and other nodes within the network, for example, the UE, a specific node of the 3GPP network, and various servers within the edge platform.

Figure 12:
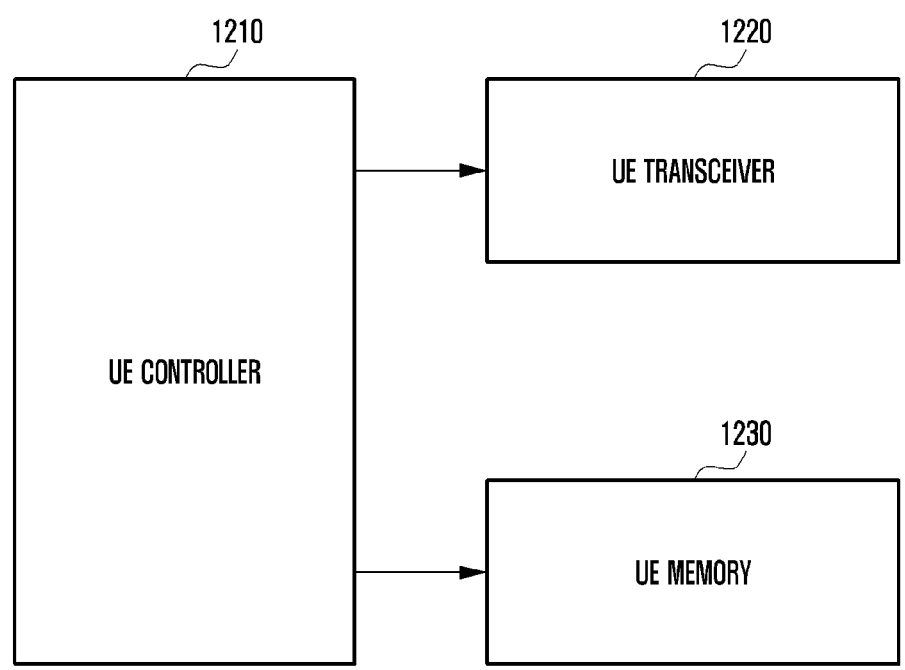
FIG. 12 is an internal block diagram of the UE according to an embodiment of the disclosure.

FIG. 12 is an internal block diagram of the UE according to an embodiment of the disclosure.

Referring to FIG. 12, the UE may include a UE controller 1210, a UE transceiver 1220, and a UE memory 1230. In addition, the UE may include a display (not shown), a key (not shown), and a touch screen for a user interface therein.

The UE controller 1210 may be implemented by at least one processor, and may perform control to execute all operations described in the disclosure. Particularly, the UE controller may control execution of applications. Further, the UE controller may control the operation of the edge enabling layers 113 and 123 of the disclosure.

The UE transceiver 1220 may include a wireless processor capable of accessing the mobile communication network and at least one communication processor for performing the control required by the mobile communication network. The UE transceiver may include 3GPP communication layers 114 and 124 in FIG. 1A above.

The UE memory 1230 may store a program for the operation of the UE, a program stored by the user, applications according to the disclosure, and control data for the operation of the edge enabling layer.

Further, the embodiments of the disclosure described and shown in the specification and the drawings have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

INDUSTRIAL APPLICABILITY

The disclosure may be used when an MEC system is applied.

The invention claimed is:

1. A method of managing an identifier of a user equipment (UE) by an edge enabler server in an edge computing system, the method comprising:
receiving, from the UE, a first message including a first Generic Public Subscription Identifier (GPSI) of the UE;
identifying validity of the first GPSI of the UE based on a profile of the UE;
in case that the first GPSI of the UE is valid,
storing an internet protocol (IP) address of the UE based on the received first message and the first GPSI of the UE; and
transmitting, to the UE, a first response message as a response to the first message,
in case that the first GPSI of the UE is not valid,
transmitting a second message to an undefined data management (UDM);
receiving a second response message including a second GPSI of the UE, as a response to the second message;
identifying validity of the first GPSI based on the second GPSI; and
in case that the first GPSI is valid based on the second GPSI, storing the first GPSI of the UE.

2. The method of claim 1, wherein the first message is one of a registration message or a service discovery message for using an edge computing service.

3. The method of claim 2, wherein the first response message is a registration response approval message when the first message is the registration message and is a response message for a type of an edge application service when the first message is the service discovery message.

4. The method of claim 3, wherein wherein the response message for the type of the edge application service includes information for accessing a corresponding application server.

5. The method of claim 1, wherein the second message includes the IP address of the UE.

6. The method of claim 1, wherein the second response message further includes policy information for the UE and a service parameter.

7. The method of claim 1, further comprising:
updating the GPSI and the IP address of the UE when the IP address of the UE is changed.

8. The method of claim 1, wherein the first response message includes edge computing service identifier information by which the UE receives an edge computing service UE.

9. The method of claim 8, wherein different pieces of the edge computing service identifier information are allocated to respective applications.

10. An apparatus of an edge enabler server in an edge computing system, the apparatus comprising:
an interface configured to communicate with a mobile communication network;
a memory configured to store an identifier of a user equipment (UE) in the mobile communication network; and
at least one processor,
wherein the at least one processor control to:
receive, from the UE a first message including a first Generic Public Subscription Identifier (GPSI) of the UE,
identify validity of the first GPSI of the UE based on a profile of the UE,
in case that the first GPSI of the UE is valid,
store an internet protocol (IP) address of the UE based on the received first message and the first GPSI of the UE, and
transmit, to the UE, a first response message as a response to the first message,
in case that the first GPSI of the UE is not valid,
transmit a second message to an undefined data management (UDM);
receive a second response message including a second GPSI of the UE, as a response to the second message;
identify validity of the first GPSI based on the second GPSI; and
in case that the first GPSI is valid based on the second GPSI, store the first GPSI of the UE.

11. The apparatus of claim 10, wherein the first message is one of a registration message or a service discovery message for using an edge computing service.

12. The apparatus of claim 11, wherein the first response message is a registration response approval message when the first message is the registration message and is a response message for a type of an edge application service when the first message is the service discovery message.

13. The apparatus of claim 12, wherein the response message for the type of the edge application service includes information for accessing a corresponding application server.

14. The apparatus of claim 10, wherein the second message includes the IP address of the UE.

15. The apparatus of claim 10, wherein the second response message further includes policy information for the UE and a service parameter.

16. The apparatus of claim 10, wherein the at least one processor is further configured to:
update the GPSI and the IP address of the UE when the IP address of the UE is changed.

17. The apparatus of claim 10, wherein the first response message includes edge computing service identifier information by which the UE receives an edge computing service.

18. The apparatus of claim 17, wherein different pieces of the edge computing service identifier information are allocated to respective applications.

* * * * *